(12) United States Patent
Archer et al.

(10) Patent No.: US 12,015,149 B2
(45) Date of Patent: Jun. 18, 2024

(54) AQUEOUS ALUMINUM BATTERIES AND METHODS OF MAKING SAME

(71) Applicant: Cornell University, Ithaca, NY (US)

(72) Inventors: Lynden A. Archer, Ithaca, NY (US); Qing Zhao, Tianjin (CN)

(73) Assignee: Cornell University, Ithaca, NY (US)

( * ) Notice: Subject to any disclaimer, the term of this patent is extended or adjusted under 35 U.S.C. 154(b) by 681 days.

(21) Appl. No.: 17/267,465

(22) PCT Filed: Aug. 12, 2019

(86) PCT No.: PCT/US2019/046200
§ 371 (c)(1),
(2) Date: Feb. 9, 2021

(87) PCT Pub. No.: WO2020/033963
PCT Pub. Date: Feb. 13, 2020

(65) Prior Publication Data
US 2021/0257612 A1 Aug. 19, 2021

Related U.S. Application Data

(60) Provisional application No. 62/717,472, filed on Aug. 10, 2018.

(51) Int. Cl.
*H01M 4/46* (2006.01)
*H01M 4/04* (2006.01)
(Continued)

(52) U.S. Cl.
CPC ......... *H01M 4/463* (2013.01); *H01M 4/0426* (2013.01); *H01M 4/366* (2013.01);
(Continued)

(58) Field of Classification Search
CPC .... H01M 4/463; H01M 4/0426; H01M 4/366; H01M 4/48; H01M 4/5815;
(Continued)

(56) References Cited

U.S. PATENT DOCUMENTS 8,748,877 B2 6/2014 Orita et al.
9,362,552 B2 6/2016 Sohn et al.
(Continued)

FOREIGN PATENT DOCUMENTS

CN 109167063 A 1/2019
JP 2007103452 A 4/2007
(Continued)

OTHER PUBLICATIONS

Jiang, T., et al., Electrodeposition of aluminium from ionic liquids: Part I—electrodeposition and surface morphology of aluminium from aluminium chloride (AlCl3)-1-ethyl-3-methylimidazolium chloride ([EMIm]Cl) ionic liquids, Surface & Coatings Technology, Jan. 19, 2006, vol. 201, pp. 1-9.
(Continued)

*Primary Examiner* — James M Erwin
(74) *Attorney, Agent, or Firm* — Hodgson Russ LLP

(57) ABSTRACT

Provided are passivation layers for batteries. The batteries may be aqueous aluminum batteries. The passivation layer may be disposed on a portion of or all of a surface or surfaces of an anode, which may be an aluminum or aluminum alloy anode. The passivation layer is bonded to the surface of the anode. The passivation layer may be an organic, nitrogen-rich material and inorganic Al-halide rich or Al-nitrate rich material. The passivation layer may be formed by contacting an aluminum or aluminum alloy substrate, which may be aluminum or aluminum alloy anode, with one or more aluminum halide and one or more ionic liquid.

42 Claims, 20 Drawing Sheets

(51) Int. Cl.
*H01M 4/36* (2006.01)
*H01M 4/48* (2010.01)
*H01M 4/58* (2010.01)
*H01M 50/417* (2021.01)
*H01M 50/437* (2021.01)
*H01M 50/44* (2021.01)
*H01M 50/491* (2021.01)
*H01M 50/497* (2021.01)

(52) U.S. Cl.
CPC .......... *H01M 4/48* (2013.01); *H01M 4/5815* (2013.01); *H01M 50/417* (2021.01); *H01M 50/437* (2021.01); *H01M 50/44* (2021.01); *H01M 50/491* (2021.01); *H01M 50/497* (2021.01); *H01M 2300/0008* (2013.01); *H01M 2300/0011* (2013.01)

(58) Field of Classification Search
CPC ............ H01M 50/498; H01M 50/437; H01M 50/417; H01M 50/44; H01M 50/491
USPC ...................................... 429/218.1
See application file for complete search history.

(56) References Cited

U.S. PATENT DOCUMENTS

| | | |
|---|---|---|
| 9,577,251 B2 | 2/2017 | Xiao et al. |
| 10,033,041 B2 | 7/2018 | Perng et al. |
| 10,217,571 B2 | 2/2019 | Xing |
| 2001/0028979 A1 | 10/2001 | Takami |
| 2012/0082904 A1 | 4/2012 | Brown et al. |
| 2013/0157148 A1 | 6/2013 | Friesen et al. |
| 2014/0272458 A1 | 9/2014 | Ruan et al. |
| 2015/0144495 A1 | 5/2015 | Chen et al. |
| 2015/0364791 A1 | 12/2015 | Vu et al. |
| 2017/0104363 A1 | 4/2017 | Mukherjee et al. |
| 2017/0179464 A1 | 6/2017 | Ein-Eli et al. |
| 2018/0138554 A1* | 5/2018 | Mukherjee .......... H01M 10/054 |
| 2018/0198124 A1 | 7/2018 | Zimmerman et al. |
| 2018/0254485 A1* | 9/2018 | Su .......... H01M 4/625 |
| 2019/0036115 A1 | 1/2019 | Friesen et al. |
| 2019/0036120 A1 | 1/2019 | Kornbluth et al. |
| 2019/0051896 A1 | 2/2019 | Wang Chen |

FOREIGN PATENT DOCUMENTS

| | | |
|---|---|---|
| WO | 2018/118951 A1 | 6/2018 |
| WO | 2018/118952 A1 | 6/2018 |
| WO | 2019/050597 A1 | 3/2019 |

OTHER PUBLICATIONS

Zhu, G., et al., Rechargeable aluminum batteries: effects of cations in ionic liquid electrolytes, RSC Advances, 2019, vol. 9, pp. 11322-11330.

* cited by examiner

AQUEOUS ALUMINUM BATTERIES AND METHODS OF MAKING SAME

CROSS REFERENCE TO RELATED APPLICATIONS

This application claims priority to U.S. Provisional Application No. 62/717,472, filed on Aug. 10, 2018, the disclosure of which is incorporated by reference herein.

STATEMENT REGARDING FEDERALLY SPONSORED RESEARCH OR DEVELOPMENT

This invention was made with government support under DE-AR0000750 awarded by the Department of Energy. The government has certain rights in the invention.

BACKGROUND OF THE DISCLOSURE

Electrochemical cells based on aluminum (Al) are of longstanding interest because Al is earth abundant, low-cost, and chemically inert. The trivalent $Al^{3+}$ ions also offer among the highest volume specific charge storage capacity (8040 mAh $cm^{-3}$), approximately four times larger than achievable for Li metal anodes. Rapid and irreversible formation of a high-electrical bandgap passivating $Al_2O_3$ oxide film on Al have to date frustrated all efforts to create aqueous Al-based electrochemical cells with high reversibility.

Aluminum (Al) anodes offer among the highest volume specific storage capacities (8040 mAh $cm^{-3}$), making rechargeable Al batteries promisingly low-cost, intrinsic safety with high-energy storage. However, Al can readily form a high-bandgap passivating oxide coating that makes the metal electrochemically inert in electrolytes. Previously, we reported that electrolytes based on the acidic ionic liquid (IL) melt $AlCl_3$-1-ethyl-3-methylimidazolium chloride ([EMIm]Cl) provides a mechanism for overcoming oxide passivation of Al anodes and therefore enable rechargeable Al batteries by pairing the metal with a metal oxide cathode.

Although the role of the IL electrolyte is poorly understood, the acidic $AlCl_3$-IL melt is thought to enable reversible stripping and plating of Al by forming $AlCl_4^-$ and $Al_2Cl_7^-$. This means that large size $AlCl_4^-$ and $Al_2Cl_7^-$ (i.e., not $Al^{3+}$) are the electrochemically active species in the IL electrolyte, frustrating most of efforts to create suitably high-capacity cathode. In addition, the highly corrosive and air sensitive characteristics of the $AlCl_3$-IL electrolytes provide additional impediments to progress most importantly reduced cell safety, increased complexity, and cost of battery design and manufacturing processes. All of which motivate interest in other types of electrolytes (like aqueous electrolytes), which can be, in principle, safe, low cost, and nontoxic. However, until recently most Al cells, such as Al-air and Al—S batteries could not be recharged in aqueous media.

Based on the foregoing, there exists an ongoing and unmet need for improved aluminum anodes.

SUMMARY OF THE DISCLOSURE

The present disclosure provides passivation layers, anodes comprising a passivation layer, and batteries comprising one or more passivation layer. Also provided are methods of making passivation layers and anodes comprising a passivation layer. In various examples, the present disclosure provides an artificial solid electrolyte interface (ASEI) on Al and methods of making same, which enable the fabrication/operation of Al batteries (e.g., rechargeable Al batteries) using an aqueous electrolyte.

In an aspect, the present disclosure provides passivation layers. The passivation layers are disposed on (e.g., disposed on at least a portion of or all of the surfaces of) an aluminum anode or an aluminum alloy anode of a battery. The passivation layer may be disposed on (e.g., bonded to) one or more surface of an anode. Non-limiting examples of these bonds include aluminum halide, O=C, and C=N bonds, and combinations thereof. In an example, the bonds are not Al—O bonds. The passivation layer may comprise an organic, nitrogen-rich material and inorganic Al-halide rich or Al-nitrate rich material. The passivation layer may further comprise a C=N containing organic material.

In various examples, a method for making a passivation layer (e.g., an aluminum or aluminum alloy anode having a passivation layer disposed on at least a portion thereof) comprises: contacting an aluminum anode or an aluminum alloy anode with a composition comprising: one or more ionic liquid; and one or more aluminum halide, where the aluminum anode or aluminum alloy having a passivation layer is formed. Various aluminum halides can be used. Combinations of aluminum halides may be used. Various ionic liquids can be used. Combinations of ionic liquids may be used. Non-limiting examples of ionic liquids include halogen-containing ionic liquids. Various aluminum halide: ionic liquid ratios can be used. The aluminum halide(s) and ionic liquid(s) can be contacted with the aluminum or aluminum alloy in various ways. In various examples, the aluminum halide(s) and ionic liquid(s) are contacted with the aluminum or aluminum alloy by a coating method. A method may further comprise removal of substantially all or all of the unreacted composition.

In an aspect, the present disclosure provides anodes. The anodes comprise a passivation layer of the present disclosure disposed on (e.g., disposed on at least a portion of or all of the surfaces of) of an aluminum anode or the aluminum alloy anode.

In an aspect, the present disclosure provides batteries. The batteries comprise one or more passivation layer. The batteries may be aqueous aluminum batteries. The batteries may be rechargeable batteries. In various examples, the battery, which may be an aqueous aluminum battery, comprises: an aluminum anode or an aluminum alloy anode having a passivation layer of the present disclosure disposed on at least a portion of the surfaces of the aluminum anode or the aluminum alloy anode; a cathode; and an aqueous electrolyte. A battery can have various electrochemically active ions. In various examples, the electrochemically active ion of the battery is or is predominantly $Al^{3+}$, Al complex cations, or a combination thereof. A battery may further comprise a polymer layer and/or a metal layer. A battery can comprise various aluminum or aluminum alloy anodes and various cathodes. A battery may comprise various aqueous electrolytes. An electrolyte may be an aqueous aluminum salt composition. A battery may further comprise a separator. An anode or a battery may also comprise a protective layer.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
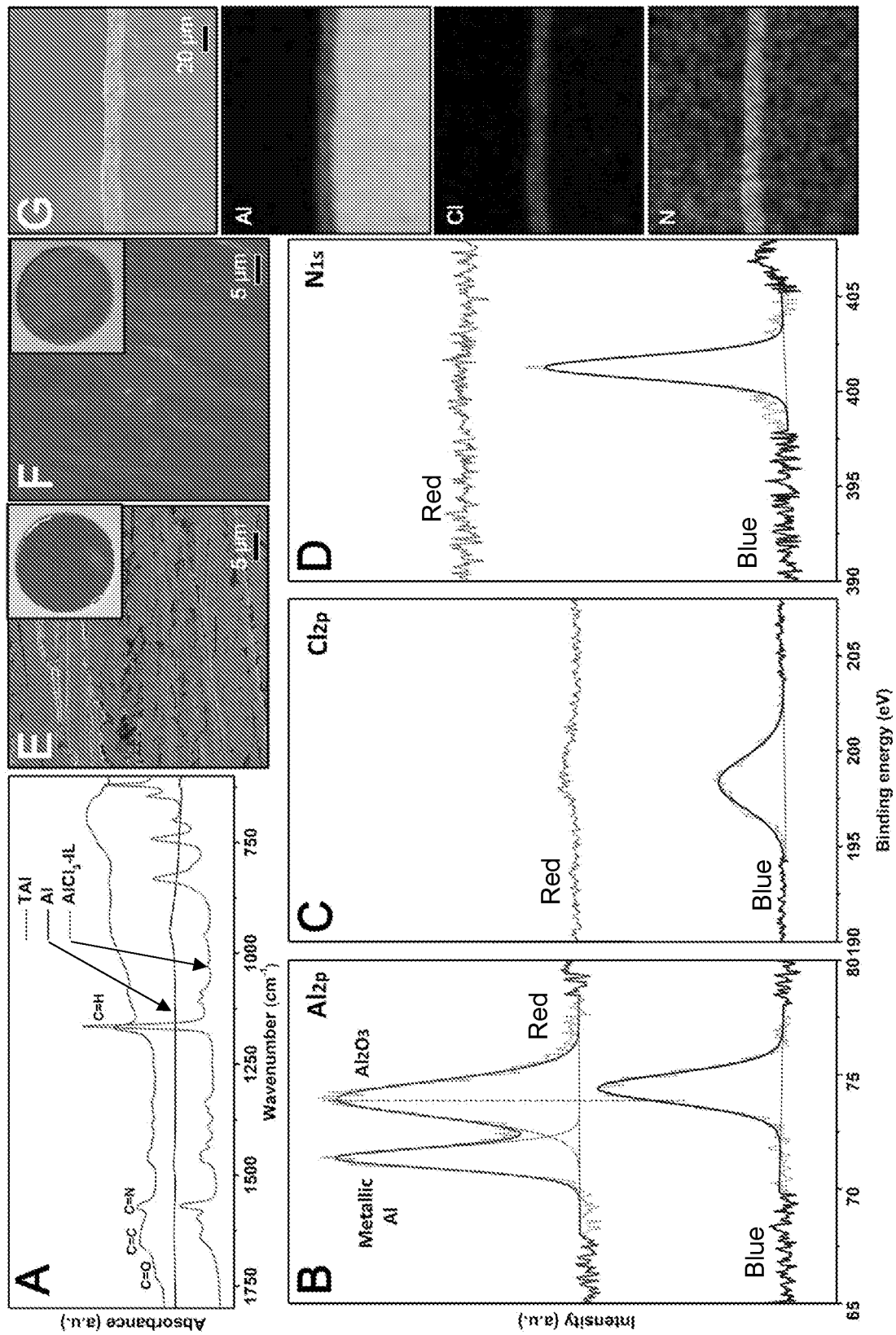
FIG. 1 shows surface characterization of metal Al before (named as Al) and after treatment of $AlCl_3$-IL electrolyte (named as TAl). (A) ATR-FTIR spectra of Al and TAl foil. XPS spectra of (B) $Al_{2p}$, (C) $Cl_{2p}$ and (D) $N_{1s}$ on the surface of Al foil and TAl foil. SEM images of the surface of (E) Al foil and (F) TAl foil. The insets of (E) and (F) are digital photos of Al foil and TAl foil. (G) Cross-sectional SEM image of a TAl foil and corresponding EDX mapping of Al, Cl and N.

Although claimed subject matter will be described in terms of certain embodiments and examples, other embodiments and examples, including embodiments and examples that do not provide all of the benefits and features set forth herein, are also within the scope of this disclosure. Various structural, logical, and process step changes may be made without departing from the scope of the disclosure.

Every numerical range given throughout this specification includes its upper and lower values, as well as every narrower numerical range that falls within it, as if such narrower numerical ranges were all expressly written herein, and, unless described otherwise, every value is included to the tenth of the value of the lower limit.

The present disclosure provides passivation layers, anodes comprising a passivation layer, and batteries comprising one or more passivation layer. Also provided are methods of making passivation layers and anodes comprising a passivation layer.

It was found that rational designing ASEI on Al provides a strategy for designing aqueous electrolytes for the Al anode. The interfaces on Al electrodes spontaneously form a tightly bound, IL-enriched film in $AlCl_3$-[EMIm]Cl electrolyte. Without intending to be bound by any particular theory, it is considered that this interface at least partially or completely erodes the $Al_2O_3$ oxide film and protects the metal against subsequent formation of the oxide. Further, we find that this interface can be transferred essentially intact when is used in conjunction with aqueous electrolytes. The treated electrodes exhibit desirable reversibility in both symmetric Al cells and in full cells in which Al is paired with a $MnO_2$ cathode. In various examples, the present disclosure provides an artificial solid electrolyte interface (ASEI) on Al and methods of making same, which enable the fabrication/operation of Al batteries (e.g., rechargeable Al batteries) using an aqueous electrolyte.

In an aspect, the present disclosure provides passivation layers. The passivation layers are disposed on (e.g., disposed on at least a portion of or all of the surfaces of) an anode (e.g., an aluminum anode or an aluminum alloy anode) of a battery. The passivation layer may be disposed on (e.g., bonded to) one or more surface of an anode. A passivation layer may partially or completely replace the original bandgap $Al_2O_3$ (or $Al_2O_3 \cdot xH_2O$) layer spontaneously formed on Al surface and/or act as Al-ion conductor. A passivation layer may be referred to as an artificial solid electrolyte interface (ASEI). In an example, a passivation layer is made by a method of the present disclosure.

The passivation layer may be bonded to one or more surface of an anode. Non-limiting examples of these bonds include aluminum halide, O=C, and C=N bonds, and combinations thereof. In various examples, the passivation layer is bonded to one or more surface of an anode by aluminum halide bonds or O=C bonds or C=N bonds or aluminum halide bonds and O=C bonds or aluminum halide bonds and C=N bonds or O=C bonds and C=N bonds or aluminum halide and O=C bonds and C=N bonds. In an example, the bonds are not Al—O bonds.

The passivation layer may comprise an organic, nitrogen-rich material and inorganic Al-halide rich or Al-nitrate rich material. The passivation layer may further comprise a C=N containing organic material (e.g., pyridine and analogues thereof, pyrrole and analogues thereof, and the like). The passivation layer may be formed by reaction of one or more aluminum halide and one or more ionic liquid.

It may be desirable that the passivation layer is hydrophobic or at least amphiphilic. At least a portion of or all of the passivation layer(s) in contact with aluminum anode or the aluminum alloy anode of a battery may be hydrophobic or at least amphiphilic. Without intending to be bound by any particular theory, it is considered that such passivation layers can avoid (e.g., minimize or eliminate) the oxidation of aluminum of an anode.

A passivation layer may further comprise a polymer layer and/or a metal layer. The polymer layer is disposed on at least a portion or all of the passivation layer(s). In an example, the polymer layer is an anionic polymer layer such as, for example, a Nafion layer, cross-linked sulfonated polymer layers, and the like.

A passivation may have been made independent of a battery (e.g., the complete battery) and then used in the battery. In an example, an anode is an anode with a pre-formed passivation layer. In another example, the passivation layer is not made in situ in the battery.

In an aspect, the present disclosure provides methods of making passivation layers. The methods can be used to make a passivation layer of the present disclosure. The methods are based on contacting an aluminum or aluminum substrate, which may be an aluminum or an aluminum alloy anode, with a composition comprising one or more ionic liquid and one or more aluminum halide.

In various examples, a method for making a passivation layer (e.g., an aluminum or aluminum alloy anode having a passivation layer disposed on at least a portion thereof) comprises: contacting an aluminum anode or an aluminum alloy anode with a composition comprising: one or more ionic liquid and one or more aluminum halide, where the aluminum anode or aluminum alloy having a passivation layer is formed.

Various aluminum halides can be used. Combinations of aluminum halides may be used. Non-limiting examples of aluminum halides include aluminum trichloride ($AlCl_3$), aluminum fluoride ($AlF_3$), aluminum bromide ($AlBr_3$), aluminum iodine ($AlI_3$), and combinations thereof.

Various ionic liquids can be used. Combinations of ionic liquids may be used. Non-limiting examples of ionic liquids include halogen-containing ionic liquids (e.g., choro-containing ionic liquids, bromo-containing ionic liquids, fluoro-containing ionic liquids, iodo-containing ionic liquids, and combinations thereof). Non-limiting examples of particular halogen-containing ionic liquids include imidazolium chlorides (e.g., 1-ethyl-3-methylimidazolium chloride ([EMIm]Cl), 1-butyl-3-methylimidazolium trifluoromethanesulfonate ([BMIm]OTF), 1-ethyl-3-methylimidazolium tetrafluoroborate, ([EMIm]$BF_4$), 1-ethyl-3-methylimidazolium bis(trifluoromethylsulfonyl)imide ([EMIm]TFSI), 1-ethyl-3-methylimidazolium bromide ([EMIm]Br), 1-ethyl-3-methylimidazolium hexafluorophosphate ([EMIm]$PF_6$), and the like, and combinations thereof), and the like, and combinations thereof.

Various aluminum halide:ionic liquid ratios can be used. In various examples, the ratio of the aluminum halide(s) to ionic liquid(s) is 0.5:1 to 2:1 (e.g., 1.5:1), including all 0.1 range values and ranges therebetween.

The aluminum halide(s) and ionic liquid(s) can be contacted with the anode (e.g., aluminum or aluminum alloy) in various ways. In various examples, the aluminum halide(s) and ionic liquid(s) are contacted with the anode (e.g., aluminum or aluminum alloy) by a coating method. Various examples of coating methods are known in the art. Non-limiting examples of coating methods include dip coating, spin coating, magnetron sputtering, atomic layer deposition, and the like.

A method may further comprise removal of substantially all or all of the unreacted composition. The unreacted composition may be removed by contacting the passivation layer and aluminum or aluminum alloy with a suitable liquid such as, for example, water, an organic compound that is a liquid (e.g., a liquid at room temperature) solvent, or a combination thereof. An organic compound may be an organic solvent. Non-limiting examples of organic compounds (e.g., organic solvents) include ester compounds and ether compounds, which may be organic ester- or ether-based solvents.

In an aspect, the present disclosure provides anodes. The anodes comprise a passivation layer of the present disclosure disposed on (e.g., disposed on at least a portion of or all of the surfaces of) of an anode (e.g., an aluminum anode or the aluminum alloy anode).

In an aspect, the present disclosure provides batteries. The batteries comprise one or more passivation layer. The batteries may be aqueous aluminum batteries. The batteries may be rechargeable batteries.

In various examples, the battery, which may be an aqueous aluminum battery, comprises: an aluminum anode or an aluminum alloy anode having a passivation layer of the present disclosure disposed on at least a portion of the surfaces of the aluminum anode or the aluminum alloy anode; a cathode; and an aqueous electrolyte.

A battery can have various electrochemically active ions. In various examples, the electrochemically active ion of the battery is or is predominantly $Al^{3+}$, Al complex cations, or a combination thereof.

A battery can comprise one or more passivation layers of various thicknesses. In various examples, the passivation layer(s) independently has/have a thickness of 2 nm to 500 microns, including all 0.1 integer nm values and ranges therebetween.

A battery may further comprise a polymer layer and/or a metal layer. In this case, the polymer layer and/or metal layer are disposed between the Al anode and the electrolyte. The polymer layer and/or a metal layer may be part of the passivation layer or independent of the passivation layer. Without intending to be bound by any particular theory, it is considered that s a polymer layer and/or a metal layer may also prevent the oxidation of aluminum by, for example, anions.

A battery can comprise various aluminum or aluminum alloy anodes. The anodes may have various shapes and sizes. An anode may comprise (or is) aluminum or an aluminum alloy. In various examples, an aluminum alloy anode comprises (or is) a non-aluminum metal chosen from silicon, iron, copper, manganese, magnesium, chromium, zinc, vanadium, titanium, barium, gallium, lead, zirconium, and the like, and combinations thereof.

A battery can comprise various cathodes. A cathode may comprise various cathode materials. Numerous examples of suitable cathodes/cathode materials are known in the art. In various examples, a cathode comprises a material (or is a material) chosen from transition metal oxides (e.g., manganese oxides such as, for example, $\alpha$-$MnO_2$, $\beta$-$MnO_2$, $\gamma$-$MnO_2$, $\varepsilon$-$MnO_2$, $\lambda$-$MnO_2$, vanadium oxides, cobalt oxides, titanium oxides, iron oxides, tungsten oxides, and the like), transition metal sulfides (e.g., $FeS_2$, $MoS_2$, $TiS_2$, $WS_2$, and the like), doped transition metal oxides or complex metal oxides (e.g., doped manganese oxides such as, for example, $Mg_xMnO_2 \cdot _yH_2O$ (x=0~1, y=0~3), $CoMn_2O_4$, and the like), doped transition metal sulfides or complex metal sulfides (e.g., $Al_xFeS_2$, and the like), aluminum-containing materials (e.g., $AlM_2O_4$, where M=Fe, Mn, Co, and the like, or a combination thereof), and the like, and combinations thereof.

A cathode may comprise one or more electronically conductive material. For example, a cathode may comprise one or more cathode material and one or more electronically conductive material. Non-limiting examples of electronically conductive materials include electrically conducting carbon materials (e.g., graphene materials, carbon black materials, and the like, and combinations thereof). The electronically conductive material may be separate from the cathode material.

A battery may comprise various aqueous electrolytes. An electrolyte comprises water (e.g., 10 to 100% by weight, including all 0.1% by weight values and ranges therebetween, water). An electrolyte may be an aqueous aluminum salt composition. The aqueous salt composition may comprise a single aluminum salt or a combination of aluminum salts. Non-limiting examples of aqueous aluminum salts include $Al(CF_3SO_3)_3$, $Al_2(SO_4)_3$, $Al(NO_3)_3$, $AlCl_3$, $Al(CH_3COO)_3$, $AlBr_3$, $AlPO_4$, $Al(PO_3)_3$, $AlF_3$, $AlI_3$, $Al(ClO_4)_3$, and combinations thereof. In an example, a battery or the electrolyte of a battery does not comprise an ionic liquid.

A battery may further comprise a separator. Various separators can be used. Numerous examples of suitable cathodes/cathode materials are known in the art. Non-limiting examples of separators or separator materials (of which a separator may be comprised) include porous inorganic or polymer materials and cation selective separators. Non-limiting examples of separators include sulfonated tetrafluoroethylene-based fluoropolymer-copolymers, such as, for example, Nafion materials, separators, and the like. Other non-limiting examples of separators include polypropylene (PP) separators, polyethylene (PE) separators, and glass fiber separators.

A battery may comprise current collector(s). For example, a battery comprises a cathode-side (first) current collector disposed on the cathode-side of a solid-state hybrid electrolyte and an anode-side (second) current collector disposed on the anode-side of the solid-state hybrid electrolyte. The current collector are each independently fabricated of a metal (e.g., aluminum, copper, or titanium) or metal alloy (aluminum alloy, copper alloy, or titanium alloy).

A battery may comprise various additional structural components (such as, for example, bipolar plates, external packaging, electrical contacts/leads to connect wires, and the like). In an example, a battery further comprises bipolar plates. In various examples, a battery further comprises bipolar plates and external packaging, and electrical contacts/leads to connect wires. In an example, repeat battery cell units are separated by a bipolar plate.

An anode comprising a protective layer, cathode, electrolyte, a cathode-side (first) current collector (if present), and an anode-side (second) current collector (if present) may form a cell. A battery may comprise a plurality of cells separated by one or more bipolar plates. The number of cells in the battery is determined by the performance requirements (e.g., voltage output) of the battery and is limited only by fabrication constraints. For example, the solid-state, ion-conducting battery comprises 1 to 500 cells, including all integer number of cells and ranges therebetween.

In an aspect, the present disclosure provides devices. A device can comprise one or more battery (e.g., one or more aqueous aluminum battery) of the present disclosure.

In an example, the device is an article of manufacture. Examples of articles of manufacture include, but are not limited to, electronic devices, lighting devices, and the like. Non-limiting examples of electronic devices include portable electronic devices, storage devices (such as, for example, static storage devices, and the like). Non-limiting examples of lighting devices include outdoor lighting devices, and the like.

An anode or a battery may also comprise a protective layer. Non-limiting examples of protective layers include polymer layers (e.g., an anionic polymer layer such as, for a Nafion layer, cross-linked sulfonated polymer layers, and the like), metal layers, and the like. Without intending to be bound by any particular theory, it is considered that a protective layer or layers can also prevent the oxidation of aluminum by, for example, anions. Suitable examples of protective layers are known in the art. Non-limiting examples of protective layers are found in PCT/US2017/067357, filed on Dec. 19, 2017 and published on Jun. 28, 2018 as WO/2018/118951; PCT/US2017/067358, filed on Dec. 19, 2017 and published on Jun. 28, 2018 as WO/2018/118952; and PCT/US2018/038434, filed on Jun. 20, 2018, the disclosures of which with respect to protective layers are incorporated herein by reference.

The steps of the method described in the various embodiments and examples disclosed herein are sufficient to produce a passivation layer of the present disclosure. Thus, in an embodiment, a method consists essentially of a combination of the steps of the methods disclosed herein. In another embodiment, a method consists of such steps.

In the following Statements, various examples of the batteries, methods, present disclosure are described:

Statement 1. An aqueous aluminum battery comprising: an aluminum anode or an aluminum alloy anode having a passivation layer of the present disclosure (also referred to as an artificial solid electrolyte interface (ASEI)) (e.g., a passivation layer made by a method according to any one of Statements 17-22) disposed on at least a portion of the surfaces of the aluminum anode or the aluminum alloy anode (e.g., the portion of the surfaces of the aluminum anode or the aluminum alloy anode that are in contact with the aqueous electrolyte); a cathode; and an aqueous electrolyte. A passivation may have been made independently of the battery (e.g., the complete battery) and then used in a battery. In an example, an anode is an anode with a preformed passivation layer. In another example, the passivation layer is not made in situ in the battery.

Statement 2. An aqueous aluminum battery according to Statement 1, where the passivation layer is bonded (e.g., chemically bonded) to the surface of the anode. Non-limiting examples of these bonds include aluminum halide (e.g., Al—F, Al—Cl, Al—Br, Al—I), O═C, and C═N bonds, and combinations thereof, rather than Al—O bonds.

Statement 3. An aqueous aluminum battery according to Statement 1, where the passivation layer comprises an organic, nitrogen-rich material and inorganic Al-halide rich (e.g., Al—F rich, Al—Cl rich, Al—Br rich, Al—I rich, and combinations thereof) or Al-nitrate rich material. The passivation layer may also include C═N containing organic material (e.g., pyridine and analogues, pyrrole and analogues, and the like).

Statement 4. An aqueous aluminum battery according to Statement 3, where the passivation layer is hydrophobic or at least amphiphilic, which is hydrophobic at the aluminum side in order to avoid (e.g., minimize or eliminate) the oxidation of aluminum.

Statement 5. An aqueous aluminum battery according to Statements 3 or 4, where the electrolyte does not comprise an ionic liquid.

Statement 6. The aqueous aluminum battery of any one of claims 3-5, where the battery further comprises a polymer layer (e.g., an anionic polymer layer such as, for a Nafion layer, cross-linked sulfonated polymer layers, and the like) and/or a metal layer. For example, these layers are disposed between the Al anode and the electrolyte, which can also prevent the oxidation of aluminum by, for example, anions.

Statement 7. An aqueous aluminum battery according to Statement 1, where the passivation layer further comprises a polymer layer (e.g., an anionic polymer layer such as, for a Nafion layer, cross-linked sulfonated polymer layers, and the like) and/or a metal layer. For example, these layers are disposed between the Al anode and the electrolyte, which can also prevent the oxidation of aluminum by, for example, anions.

Statement 8. An aqueous aluminum battery according to any one of the preceding Statements, where the aluminum alloy comprises a non-aluminum metal chosen from silicon, iron, copper, manganese, magnesium, chromium, zinc, vanadium, titanium, barium, gallium, lead, zirconium, and the like, and combinations thereof.

Statement 9. An aqueous aluminum battery according to any one of the preceding Statements, where the passivation layer has a thickness of 2 nm to 500 microns, including all nm values and ranges therebetween.

Statement 10. An aqueous aluminum battery according to any one of the preceding Statements, where the cathode comprises a material (or is a material) chosen from transition metal oxides (e.g., manganese oxides such as, for example, α-$MnO_2$, β-$MnO_2$, γ-$MnO_2$, ε-$MnO_2$, λ-$MnO_2$, vanadium oxides, cobalt oxides, titanium oxides, iron oxides, tungsten oxides, and the like), transition metal sulfides (e.g., $FeS_2$, $MoS_2$, $TiS_2$, $WS_2$, and the like), doped transition metal oxides or complex metal oxides (e.g., doped manganese oxides such as, for example, $Mg_xMnO_2 \cdot yH_2O$, $CoMn_2O_4$, and the like), and doped transition metal sulfides or complex metal sulfides (e.g., $Al_xFeS_2$, and the like), aluminum-containing materials (e.g., $AlM_2O_4$, where M=Fe, Mn, Co, and the like, or a combination thereof), and the like, and combinations thereof.

Statement 11. An aqueous aluminum battery according to any one of the preceding Statements, where the electrolyte is 10 to 100% by weight water, including all 0.1% by weight values and ranges therebetween.

Statement 12. An aqueous aluminum battery according to any one of the preceding Statements, where the electrolyte is chosen from aqueous aluminum salt compositions (e.g., $Al(CF_3SO_3)_3$, $Al_2(SO_4)_3$, $Al(NO_3)_3$, $AlCl_3$, $Al(CH_3COO)_3$, $AlBr_3$, $AlPO_4$, $Al(PO_3)_3$, $AlF_3$, $AlI_3$, $Al(ClO_4)_3$, and the like), and the like, and combinations thereof. The aluminum salt(s) can be present in various concentrations.

Statement 13. An aqueous aluminum battery according to any one of the preceding Statements, where the electrochemically active ion is (e.g., predominantly is) $Al^{3+}$ or Al complex cations (e.g., $Al(CF_3SO_3)_2^{2+}$, and the like), and the like, or a combination thereof.

Statement 14. An aqueous aluminum battery according to any one of the preceding Statements, where the battery is rechargeable.

Statement 15. An aqueous aluminum battery of any one of the preceding claims, where the battery further comprises a separator. The separators can be any porous inorganic or polymer materials (e.g., polypropylene (PP) and polyethylene (PE) separators, glass fiber separators, and the like) or cation selective separators (e.g., sulfonated tetrafluoroethylene based fluoropolymer-copolymers, such as, for example, Nafion materials, separators, and the like).

Statement 16. An aluminum anode comprising a passivation layer as described herein (e.g., a passivation layer as described in Statements 1-9).

Statement 17. A method for making an aluminum anode having a passivation layer of the present disclosure (also referred to as an artificial solid electrolyte interface (ASEI)) (e.g., a passivation layer as described in Statements 1-9) (e.g., comprising: contacting an anode (e.g., an aluminum anode or an aluminum alloy anode) with a composition comprising: one or more ionic liquid; and aluminum trichloride ($AlCl_3$), aluminum fluoride ($AlF_3$), aluminum bromide ($AlBr_3$), aluminum iodine ($AlI_3$), or a combination thereof, where the aluminum anode or aluminum alloy having a passivation layer is formed). A method may be carried out independent from a battery (e.g., a complete battery). In another example, the method is not carried out in situ in a battery.

Statement 18. A method according to Statement 17, where the ionic liquid is a halogen-containing ionic liquid (e.g., choro-containing ionic liquids, bromo-containing ionic liquids, fluoro-containing ionic liquids, iodo-containing ionic liquids, and combinations thereof).

Statement 19. A method according to Statement 18, where the halogen-containing ionic liquid is chosen from imidazolium chlorides (e.g., 1-ethyl-3-methylimidazolium chloride ([EMIm]Cl), 1-butyl-3-methylimidazolium trifluoromethanesulfonate ([BMIm]OTF), 1-Ethyl-3-methylimidazolium tetrafluoroborate, ([EMIm]$BF_4$), 1-Ethyl-3-methylimidazolium bis(trifluoromethylsulfonyl)imide ([EMIm]TFSI), 1-Ethyl-3-methylimidazolium bromide ([EMIm]Br), 1-Ethyl-3-methylimidazolium hexafluorophosphate ([EMIm]$PF_6$), and the like, and combinations thereof), and the like, and combinations thereof.

Statement 20. A method according to any one of Statements 17-19, where the ratio of the aluminum halide(s) (e.g., aluminum trichloride) to ionic liquid(s) is 0.5:1 to 2:1 (e.g., 1.5:1), including all 0.1 range values and ranges therebetween.

Statement 21. A method according to any one of Statements 17-20, where the contacting comprises coating (e.g., dip coating, spin coating, magnetron sputtering, atomic layer deposition, and the like) the composition on the aluminum anode or an aluminum alloy anode.

Statement 22. A method according to any one of Statements 17-21, where the method further comprises removal (e.g., by contacting with a suitable liquid such as, for example, water) of substantially all or all of the unreacted composition.

Statement 23. A device comprising one or more aqueous aluminum battery of the present disclosure and/or one or more anode of the present disclosure and/or one or more passivation layer of the present disclosure (e.g., one or more aqueous aluminum battery of any one of Statements 1-16 and/or a passivation layer made by any one of Statements 17-22).

Statement 24. A device according to Statement 23, where the device is an electronic device.

Statement 25. A device according to Statement 24, where the electronic device is a portable electronic device or a storage device.

The following examples are presented to illustrate the present disclosure. They are not intended to limiting in any matter.

EXAMPLE 1

This is an example of passivation layers of the present disclosure, characterization of same, methods of making same, and uses of same.

Interphases formed on metallic Al in contact with ionic liquid (IL) electrolytes were investigated and it was found that artificial solid electrolyte interphases (ASEI) formed spontaneously on the metal permanently transform its interfacial chemistry. The resultant IL-ASEI were further shown to enable aqueous Al electrochemical cells with unprecedented reversibility. As an illustration of the potential benefits of such interphases, simple Al∥$MnO_2$ aqueous cells were created and they provide high specific energy (500 Wh/kg) and intrinsic safety features required for applications.

Described are interphases formed on Al electrodes in $AlCl_3$-[EMIm]Cl and that a tightly bound, IL-enriched film spontaneously forms on the interface that appears to simultaneously erode the $Al_2O_3$ oxide film and protects the metal against subsequent formation of the oxide. Further, we found that this interface can be transferred essentially intact when an $AlCl_3$-IL-treated Al substrate is used in conjunction with aqueous electrolytes. The treated electrodes exhibit exceptional reversibility in both symmetric Al cells and in full cells in which Al was paired with a $MnO_2$ cathode.

Figure 5:
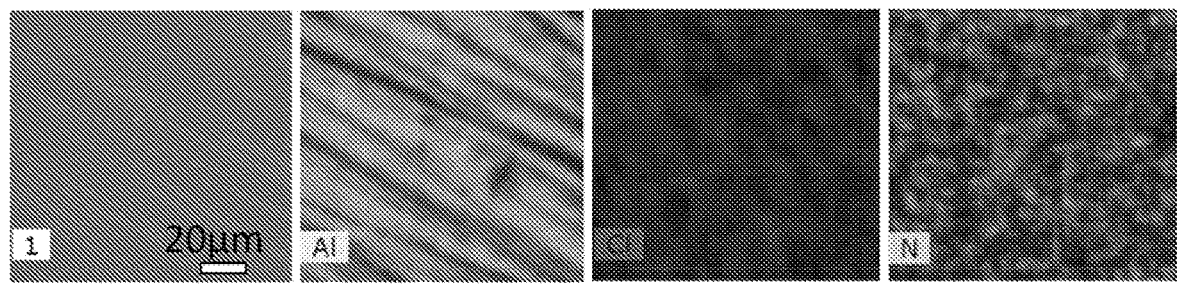
FIG. 5 shows SEM EDX mapping spectra on the top view of TAL. Al, N and Cl are mainly element on the surface of Aluminum.

Results—Design interphase for aqueous Al batteries—The structure and composition of the interface formed on an Al electrode in an $AlCl_3$-IL electrolyte (TAl electrode) were interrogated using attenuated total reflection-Fourier transform infrared spectroscopy (ATR-FTIR), scanning electron microscopy (SEM), energy-dispersive X-ray spectroscopy (EDX), and X-ray photoelectron spectroscopy (XPS). Compared with pure Al, the surface of TAl is enriched with organic functional groups (FIG. 1A). In addition to the presence of C=N and C—H groups that are also abundant in the pristine IL electrolyte, a large enhancement in the C=C functional group and emergence of species containing the C=O group were detected on TAl. These observations were accompanied by the appearance of a stable film on the TAl surface. Additionally, IR vibration modes associated with the imidazolium ring (1100~600 $cm^{-1}$) in the IL largely disappeared upon treatment, which indicates that the IL electrolyte is chemically transformed at the Al interface (FIG. 1A). XPS analysis of the pristine Al and TAl provide additional insights about the surface chemical features of TAl. Results in FIG. 1B, for example, show that even after polishing, $Al_2O_3$ still dominates the surface chemistry of the pristine Al. In contrast, the $Al_{2p}$ XPS spectra of TAl substrate reveals that a composite with higher binding energy, which can be attributed to an Al salt, likely $AlCl_3$, dominates. This was confirmed by the $Cl_{2p}$ XPS spectra since the binding energy of $Cl_{2p}$ located at about 199 eV, is consistent with a valence of −1 (FIG. 1C). The $N_{1s}$ XPS spectra also show that the interface of the TAl is enriched in nitrogen containing species. The sharp peak at 401 eV can be used to unequivocally identify the presence of imidazole ions (FIG. 1D). Compared with a pristine polished Al surface (FIG. 1E), the surface topography of TAl is obviously smoother (FIG. 1F). From the cross section view imaged by SEM, an interfacial layer was observed on the Al substrate. EDX analysis of the layer shows that it is rich in the elements Al, Cl and N (FIG. 1G and FIG. 5).

Figure 2:
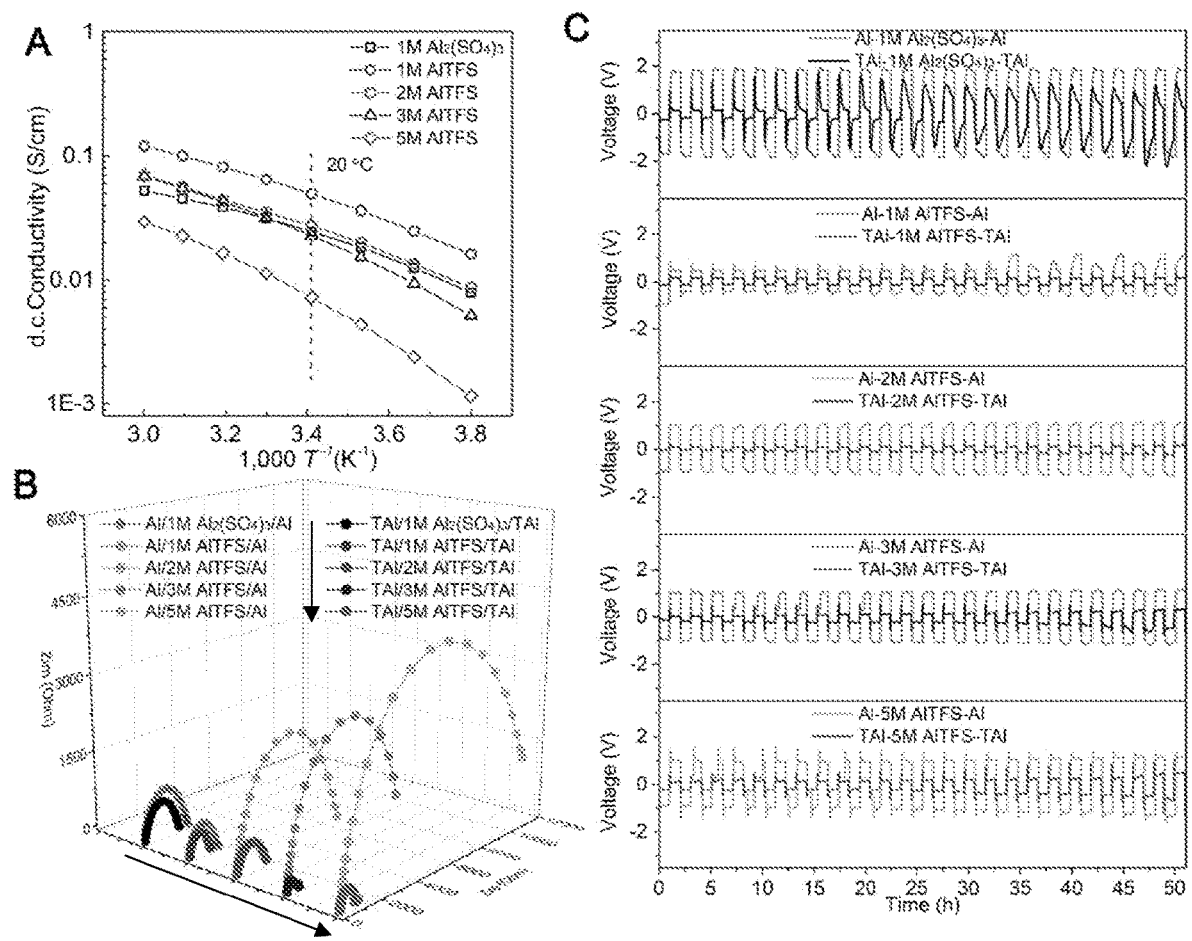
FIG. 2 shows electrochemical studies of aqueous electrolytes in Al batteries. (A) d.c. ionic conductivity of aqueous aluminum sulfate $[Al_2(SO_4)_3]$ electrolyte and aluminum trifluoromethanesulfonate $[Al(CF_3SO_3)_3$ or AlTFS] electrolytes with varying different concentrations as a function of temperature. (B) Electrochemical impedance spectroscopy (EIS) of symmetric Al batteries using different Al anodes and electrolytes. (C) Symmetric Al batteries tests using Al and TAl coupled with different electrolytes. The current density is 0.2 mA cm$^{-2}$. Each cycle contains the discharge process for one hour and charge process for one hour, separately.

A good SEI for Al must not only prevent formation of the passivating $Al_2O_3$ coating, but must also enable fast charge transport at the electrolyte/electrode interface and reversible deposition of Al during electrochemical cycling. To evaluate charge transport characteristics and stability of the interface formed on the TAl electrode, the reversibility of Al plating and stripping processes were investigated in aqueous electrolytes containing $Al_2(SO_4)_3$ and $Al(CF_3SO_3)_3$ (AlTFS) salts at concentrations ranging from 1M to 5M. Results reported in FIG. 2A indicate that the electrolytes generally have high ionic conductivity. Specifically, at 20° C. conductivity values of 24.6, 49.6, 27.5, 22.8, 7.26 mS/cm are recorded for the 1M $Al_2(SO_4)_3$, and the 1M, 2M, 3M, 5M AlTFS electrolytes, respectively. It is also apparent from the plot that the ionic conductivities of all electrolytes are above 1 mS/cm at temperatures in the range of −10 to 60° C. The crucial role interface chemistry plays in the reversibility of ion transport to the electrode is readily seen by comparing the charge transfer resistance for the pristine and TAl electrodes. As shown in FIG. 2B, the charge-transfer resistances of symmetric pristine Al cells using aqueous electrolytes are enormous, as high as 5500 Ohms and over 10000 Ohms for the 2M and 5M AlTFS electrolytes, respectively. Whatever the conductivity of the electrolytes, such high charge transfer resistances make the pristine Al electrode unviable as a candidate for a rechargeable aqueous Al electrochemical cell. In contrast, the figure shows that much smaller charge-transfer resistances are observed in symmetric cells based on TAl electrodes, underscoring the importance of the interfacial layer on charge transfer to the electrode. Interestingly, the results show that the differences between charge transfer resistance of pristine Al and TAl electrodes are reduced in aqueous electrolytes with lower salt concentrations, indicating a proper concentration is needed to keep the interface durable.

Figure 6:
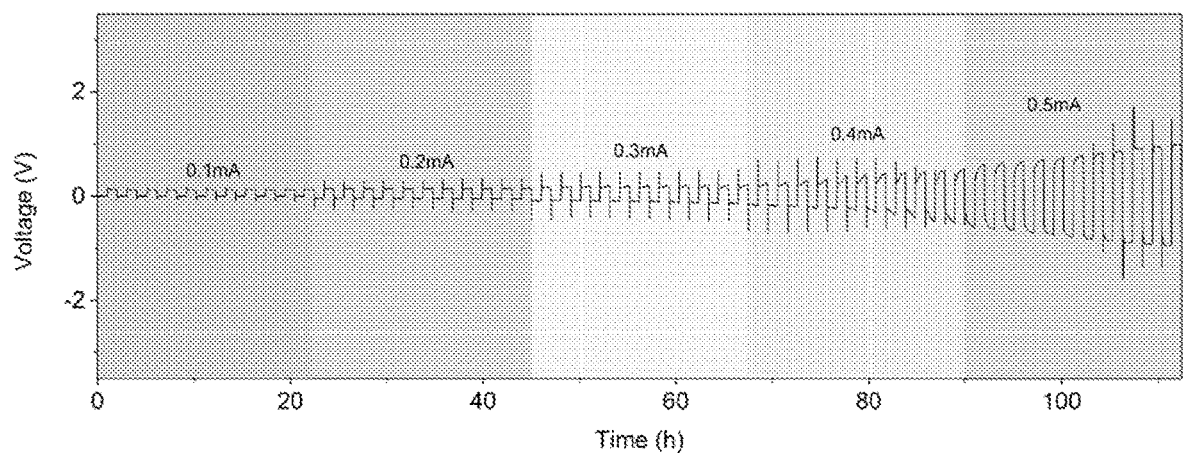
FIG. 6 shows rate performance of symmetric Al batteries using TAl and electrolyte of 1M AlTFS in water. The current densities increase from 0.1 mA/cm$^2$ to 0.5 mA/cm$^2$.
Figure 7:
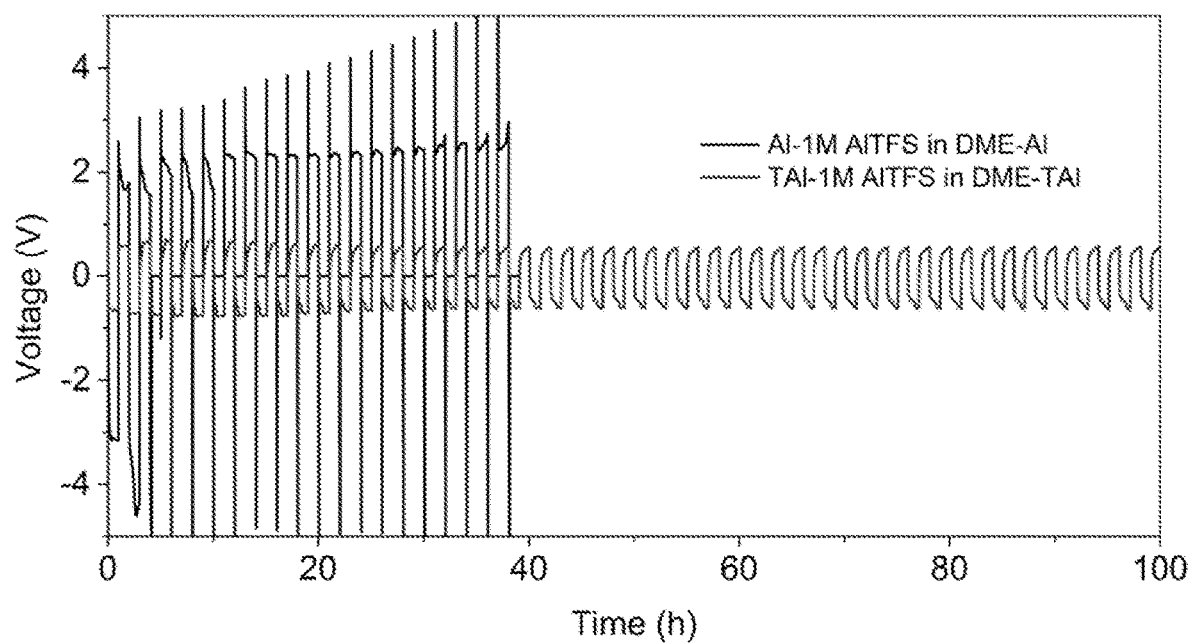
FIG. 7 shows symmetric Al batteries tests using Al and TAl coupled with organic electrolyte [1M AlTFS dissolved in dimethoxyethane (DME)]. The current density is 0.2 mA/cm$^2$.
Figure 8:
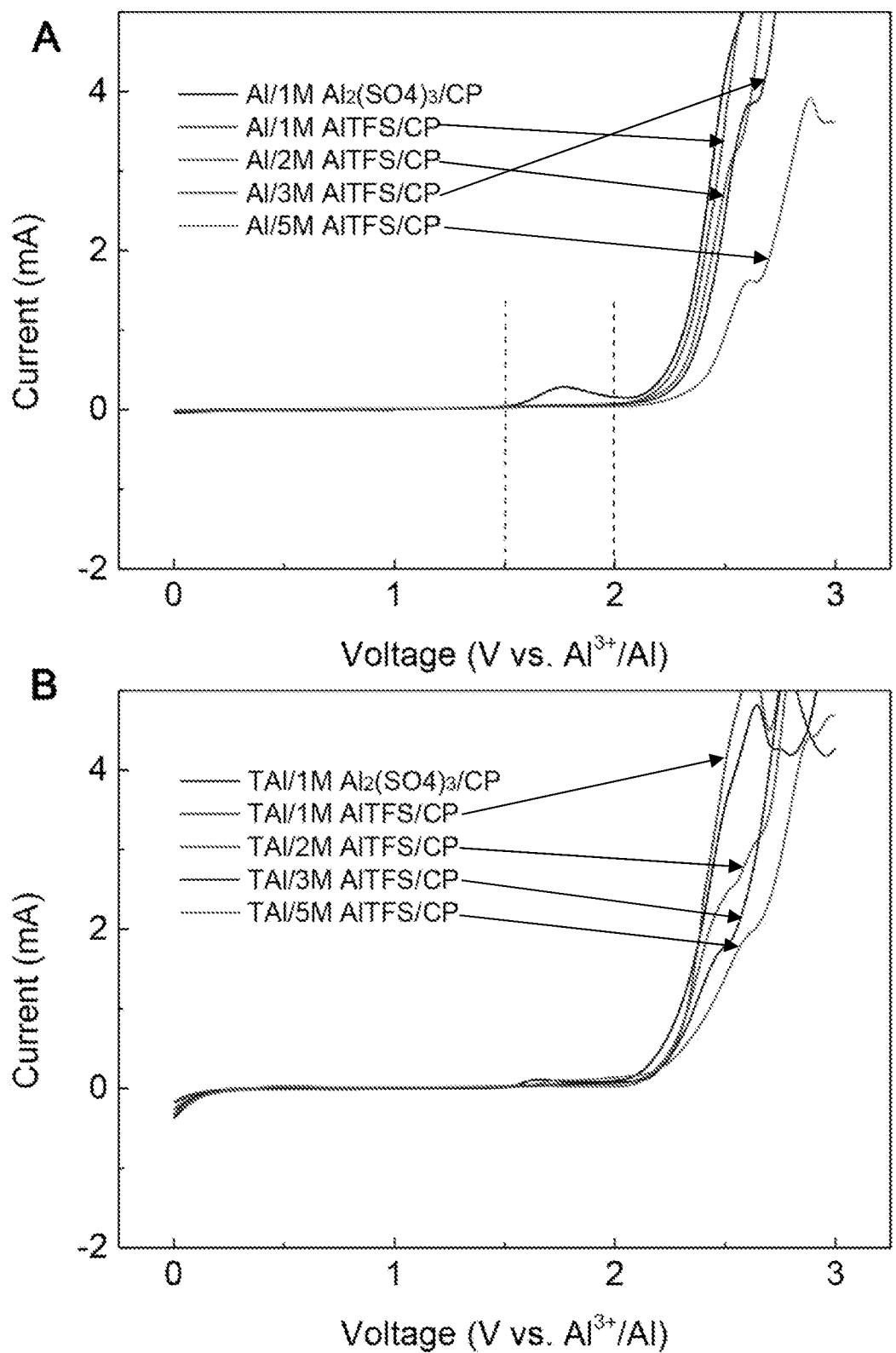
FIG. 8 shows CV diagrams of Al-carbon fiber (CP) batteries. CV curves of cells using (A) Al foil and (B) TAl foil as anode, carbon fiber paper (CP) as cathode, aqueous $Al_2(SO_4)_3$ electrolyte and AlTFS electrolytes. The scanning rate is 1 mV/S and voltage region is from 0 V to 3 V. After treating with ionic liquid electrolyte, the stability of $Al_2(SO_4)_3$ is also slightly improved, and the electrolytes with AlTFS salts are remained.
Figure 9:
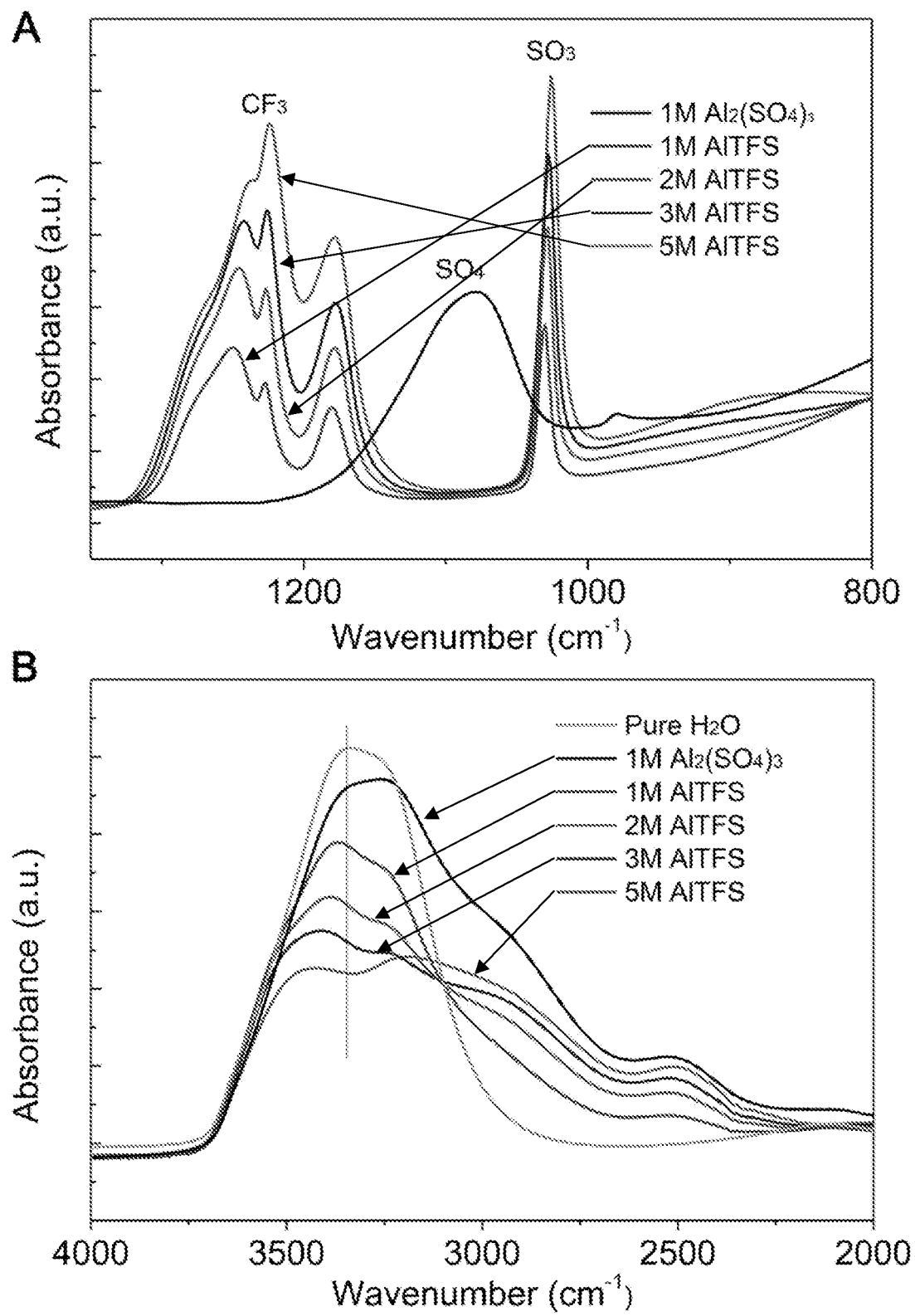
FIG. 9 shows ATR-FTIR spectra (A and B) of different electrolytes. Typical vibrations belong to the functional group of $CF_3$, $SO_3$ and $SO_4$ are detected in the electrolytes, confirming the salts of $Al(CF_3SO_3)_3$ and $Al_2(SO_4)_3$. When comparing the peak of water in different electrolyte, the peaks show large blue shift for AlTFS based electrolyte, indicating the interaction between the large anion ($CF_3SO_3^-$) and $H_2O$. The interaction increases with increasing the concentration of electrolyte.
Figure 10:
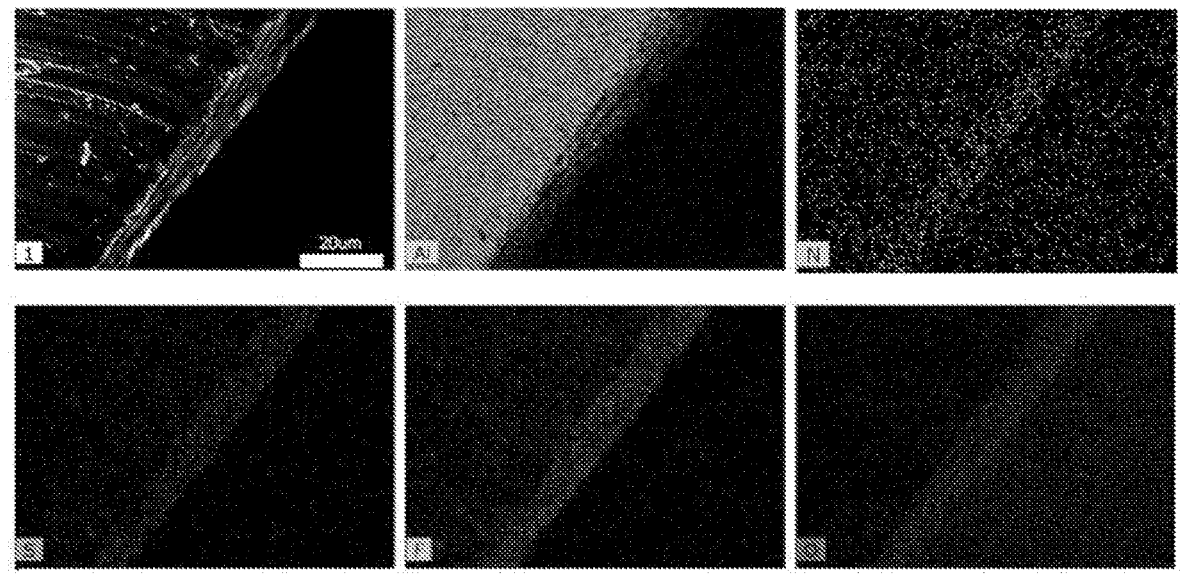
FIG. 10 shows cross-sectional SEM image of a TAl foil and corresponding EDX mapping after cycling in symmetric batteries. After cycling, a complicated SEI on Al is generated including the element in salts of electrolytes. An organic layer is considered on the surface of Al because the N element is still enriched. The $AlCl_3$ is considered to be dissolved in the electrolyte to form an acidic environment, which is not founded enriched on Al anode.

Comparison of the over-potential for Al stripping/plating in cells based on pristine Al and TAl electrodes (FIG. 2C) shows that cells using $Al_2(SO_4)_3$ electrolyte and a pristine Al electrode exhibit extremely high over-potentials. The potential gap between plating and stripping is about 4 V. For comparison, the gap is 1V for 1M AlTFS and about 2.0 V for 5M AlTFS electrolytes when pristine Al electrodes are used. These high potential gaps stand in sharp contrast to those evident in the 1M and 2M AlTFS electrolytes using TAl electrodes, where the gap between plating and stripping is about 0.2 V. The gap increases with increasing salt concentration in the electrolytes, but is seen to remain relatively low even at high current densities (FIG. 6), confirming that a proper concentration associated with high thermodynamic stability is needed to stabilize the ASEI. More important, even in a non-corrosive organic electrolyte (1M AlTFS in dimethoxyethane), the TAl also exhibits much lower polarization than that of Al anode (FIG. 7). These results confirm that the interphases formed on the TAl electrode are favorable for ion transport and that the chemistry of the electrolyte salt employed in an aqueous electrolyte plays an additional beneficial role. Results reported in FIG. 8 show that the salt plays an additional important role in the high voltage stability of the cell. Specifically, it is seen that the concentration of AlTFS influences the potential range over which the aqueous electrolyte is electrochemically stable. This phenomenon is thought to reflect changes in the interface composition and in the interaction strength between salt and water at high salt concentrations, observations that are partially confirmed by ATR-FTIR spectra (FIG. 9). In combination with previous surface characterization, we propose the organic surface layer prevents oxidation of the aluminum, and the $AlCl_3$ and aqueous electrolyte provide an acidic internal environment that further stabilizes the ASEI, which together maintain a fresh Al surface and enable the operation of cells (FIG. 10).

Figure 3:
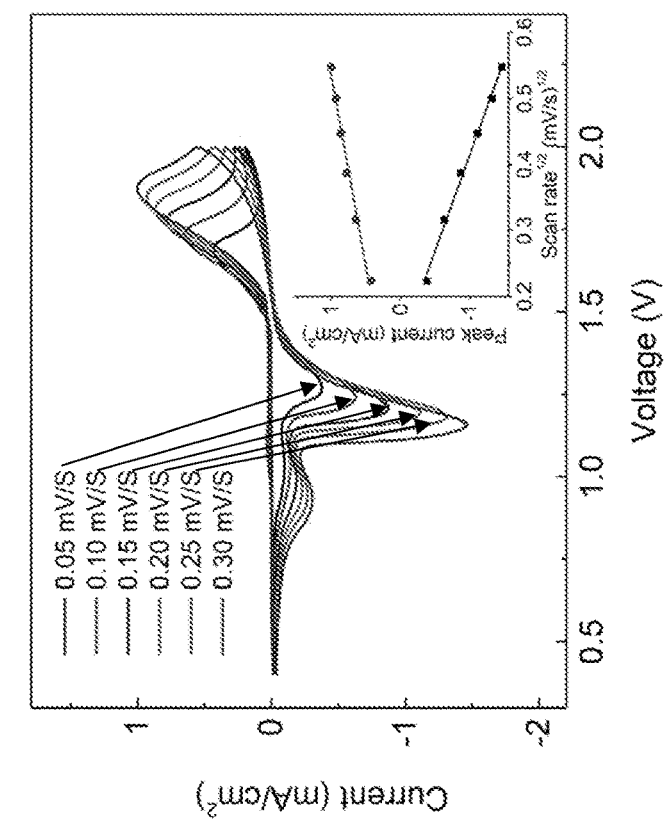
FIG. 3 shows electrochemical performance of aqueous rechargeable Al batteries using $\alpha$-$MnO_2$ as the cathode. (A) Galvanostatic discharge/charge curves of aqueous Al batteries at a current density of 100 mA/g ($MnO_2$) using TAl and electrolyte of 2 M AlTFS in $H_2O$. (B) CV diagram at scanning rates of 0.05, 0.10, 0.15, 0.20, 0.25, 0.30, 0.35 mV/s. The inset is the linear fit of the square root of the scan rate and the peak current. (C) Cycling performance of aqueous Al batteries using Al or TAl and electrolyte of 2 M or 1M AlTFS. (D) Rate performance at different current densities using TAl and 2M AlTFS.
Figure 3:
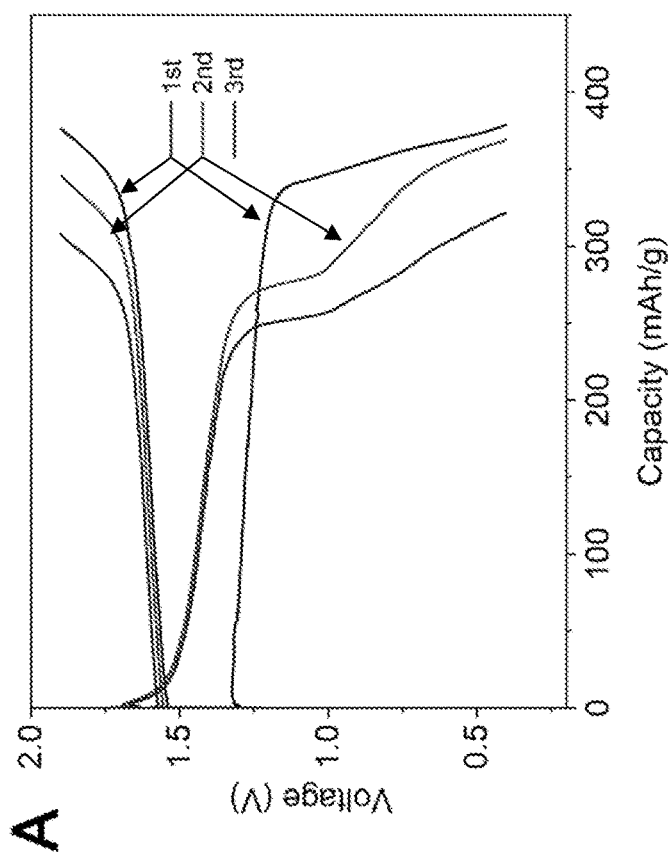
Figure 3:
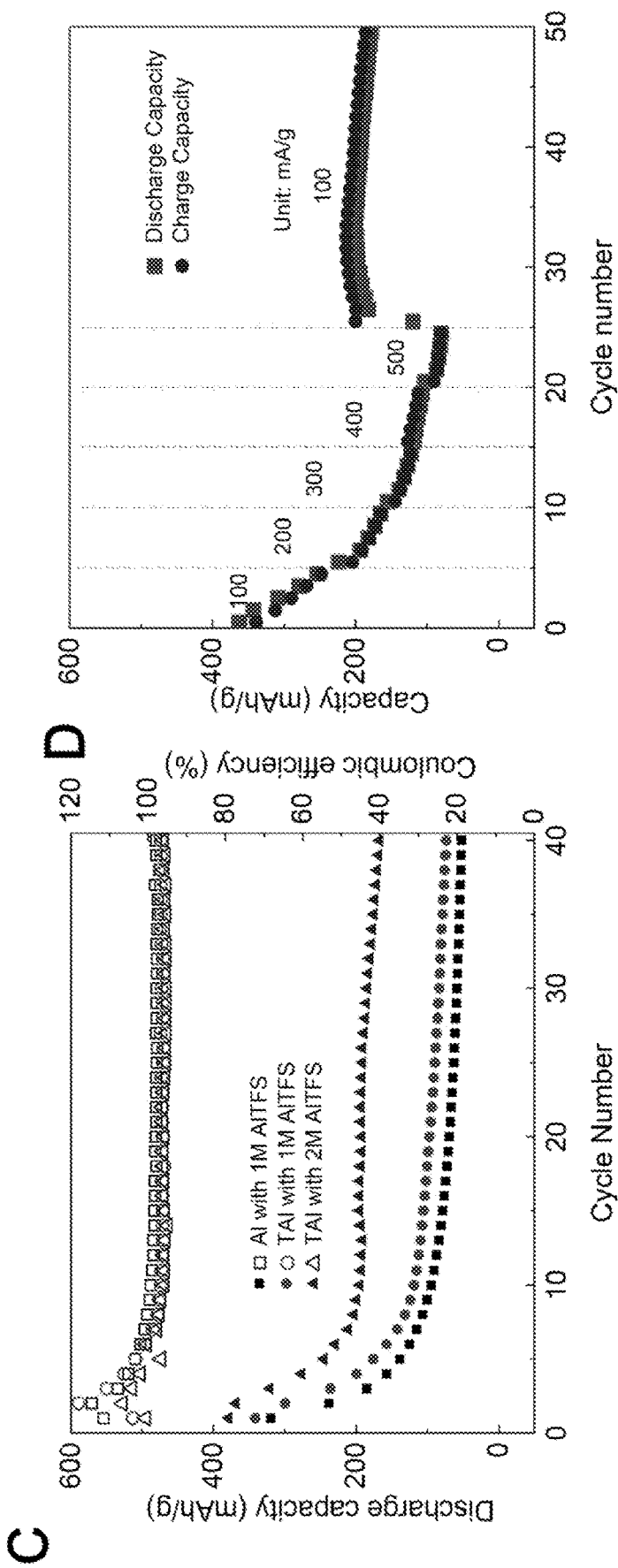
Figure 11:
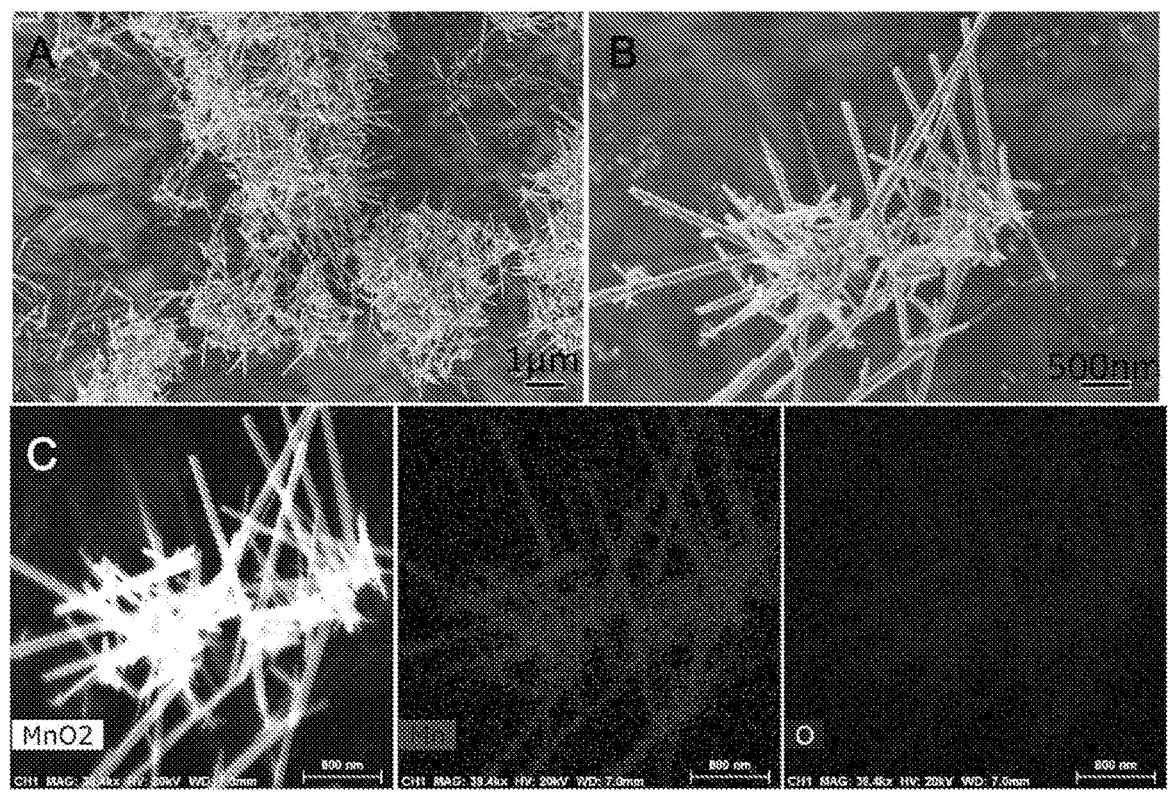
FIG. 11 shows (A), (B) SEM images and (C) corresponding EDX mapping spectra $\alpha$-$MnO_2$ nanorods.
Figure 12:
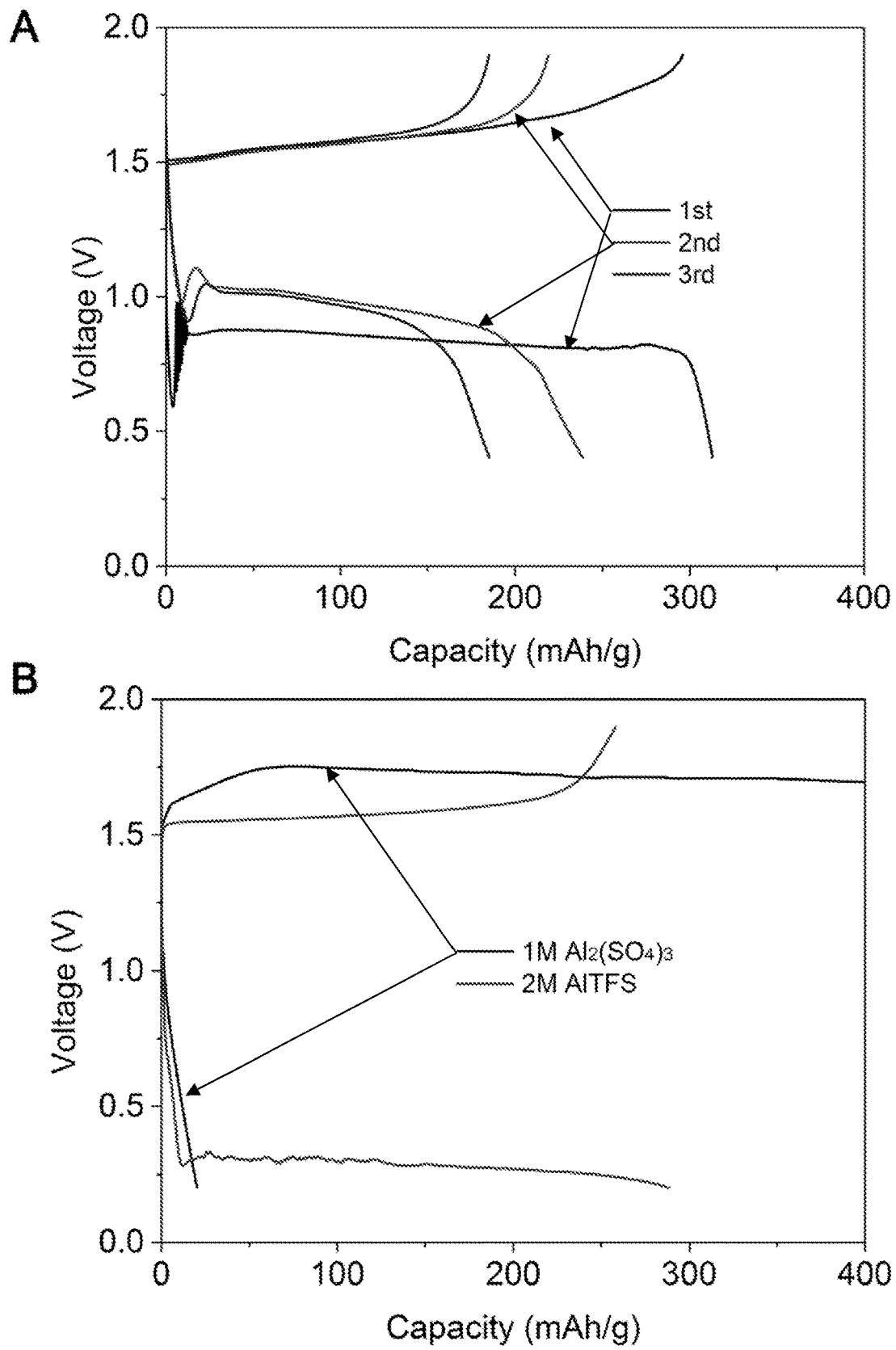
FIG. 12 shows galvanostatic discharge/charge curves of aqueous Al batteries using common Al anode. (A) Using electrolyte of 1M AlTFS and (B) Using electrolyte of 2M AlTFS and $Al_2(SO_4)_3$. The current density is 100 mA/g ($MnO_2$). When using common Al as anode, the batteries with 1M AlTFS can operate under large polarization. As comparisons, when increasing the concentration of AlTFS to 2M, the polarization is over 1 V. In that case, the Al—$MnO_2$ can display a capacity closed to 300 mAh/g at the potential of about 0.3 V. For $Al_2(SO_4)_3$ electrolyte, the Al—$MnO_2$ batteries can hardly work, and the charging process seem endless during to the decomposition of electrolyte.
Figure 13:
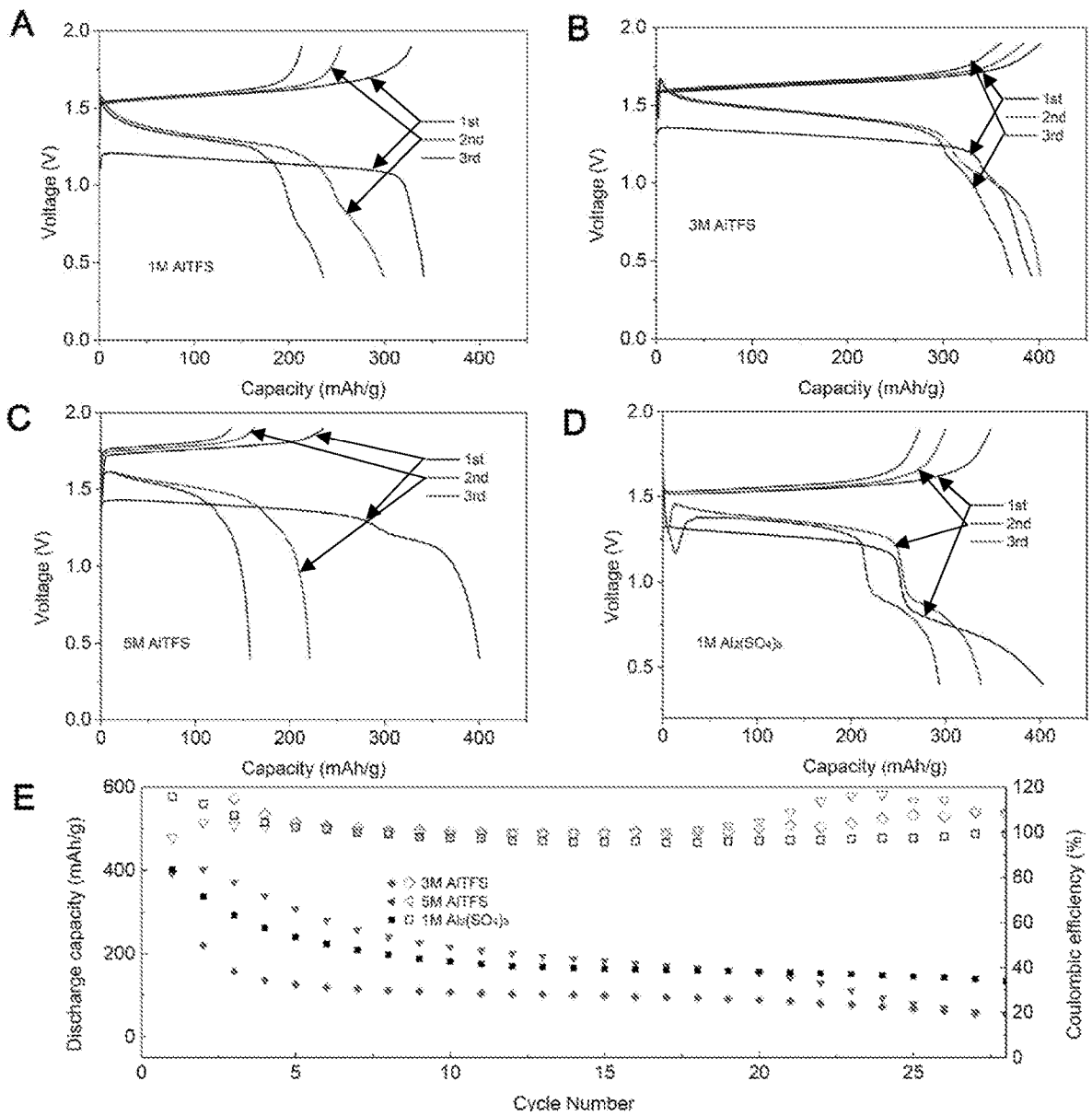
FIG. 13 shows electrochemical properties of Al—$MnO_2$ batteries using TAl anode and AlTFS based aqueous electrolyte. Galvanostatic discharge/charge curves using (A) 1M AlTFS, (B) 3M AlTFS, (C) 5M AlTFS (D) 1M $Al_2(SO_4)_3$ electrolyte at current density of 100 mA/g; (E) corresponding cycling performance of 3M AlTFS, 5M AlTFS, and 1M $Al_2(SO_4)_3$. All the electrolyte can operate coupled with TAl anode and display narrow polarization. However, the cycling performance using higher concentration of AlTFS (3M and 5M) is not as good as low concentration, which may be caused by the low ionic conductivity of thick SEI formed by high concentration electrolyte.
Figure 14:
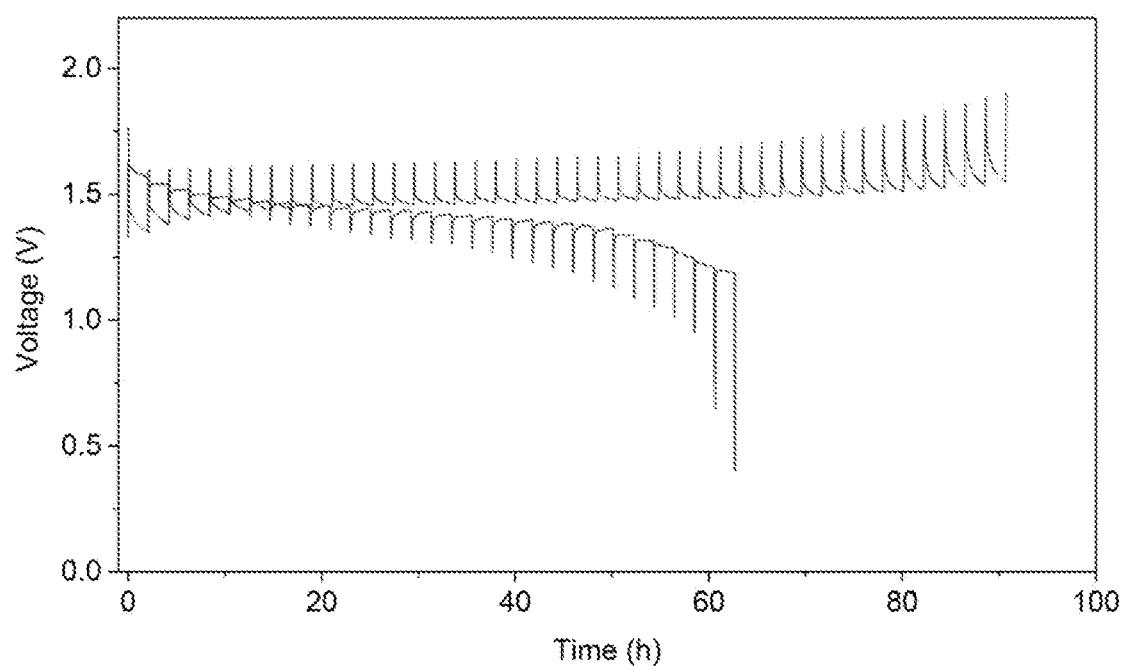
FIG. 14 shows GITT profiles of Al—$MnO_2$ batteries. (A) Using TAl, (B) using common Al. The GITT profiles are obtained thorough the following steps, discharge/charge at 100 mA/g for 5 mins and then rest for 120 mins. The profiles confirm that the Al-striping process from Al anode is the sluggish process for common Al anode. The artificial SEI formed by TL treating can largely facilitate this process.
Figure 14:
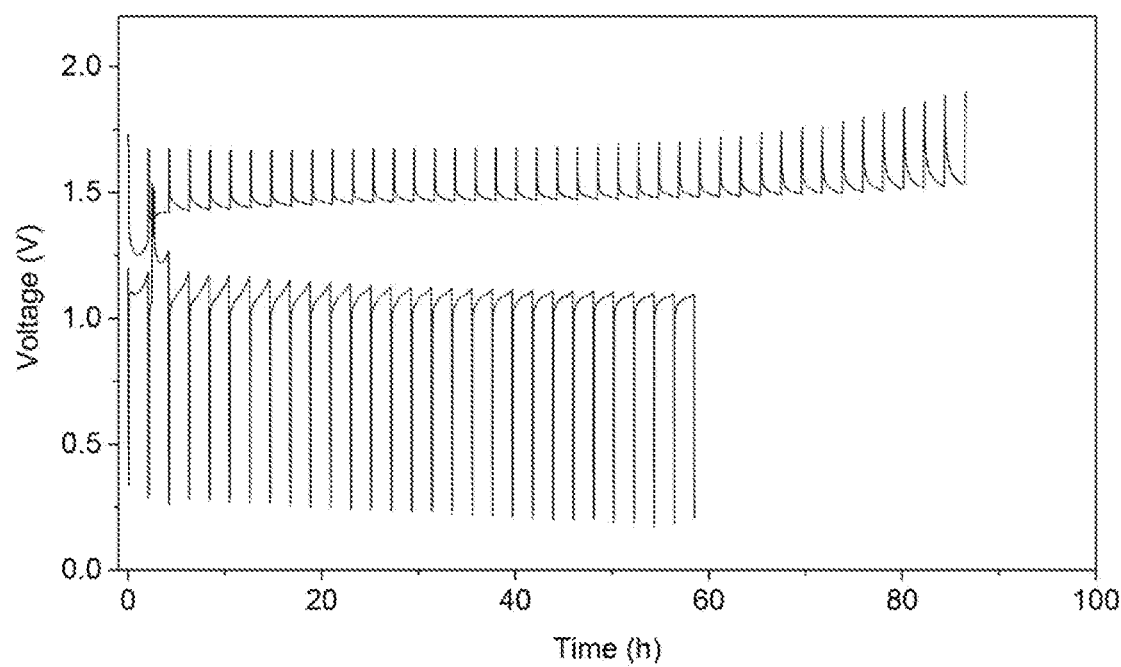

Aqueous Al batteries with Metal oxide cathodes—Building on the success of the TAl electrodes in facilitating reversible stripping and plating of Al in aqueous liquid electrolytes, applications of such electrodes and electrolytes in full-cell Al batteries were explored. $MnO_2$ was chosen for the cathode because it has a tunable structure and variable valence, and is a cathode candidate for high-capacity charge storage. A hydrothermal method that enables facile synthesis of α-$MnO_2$ in a nanorod morphology was used (FIG. 11). The one-dimensional nanostructures are advantageous because they should facilitate fast charge transport in the cathode. In cells employing pristine Al, the electrochemical process is generally very sluggish, but an aqueous electrolyte based on 1M AlTFS exhibits good reversibility with the $MnO_2$ cathode (FIG. 12). The cell polarization is high (ca. 0.8 V), however, implying that there are large inefficiencies during the charge and discharge processes at the electrodes. The corresponding results for cells based on TAl electrodes are shown in FIG. 3A, FIG. 13. It is seen that these cells exhibit both high reversibility and low levels of polarization. For example, TAl—$MnO_2$ cells that utilize a 2M AlTFS electrolyte display a high specific capacity of 380 mAh/g and average discharge potential of ~1.4 V, corresponding an energy density over 500 Wh/kg. The important role that the interface formed on Al in the AlCl$_3$-IL melt plays in facilitating Al stripping processes is further confirmed by the galvanostatic intermittent titration technique (GITT) (FIG. 14).

Figure 15:
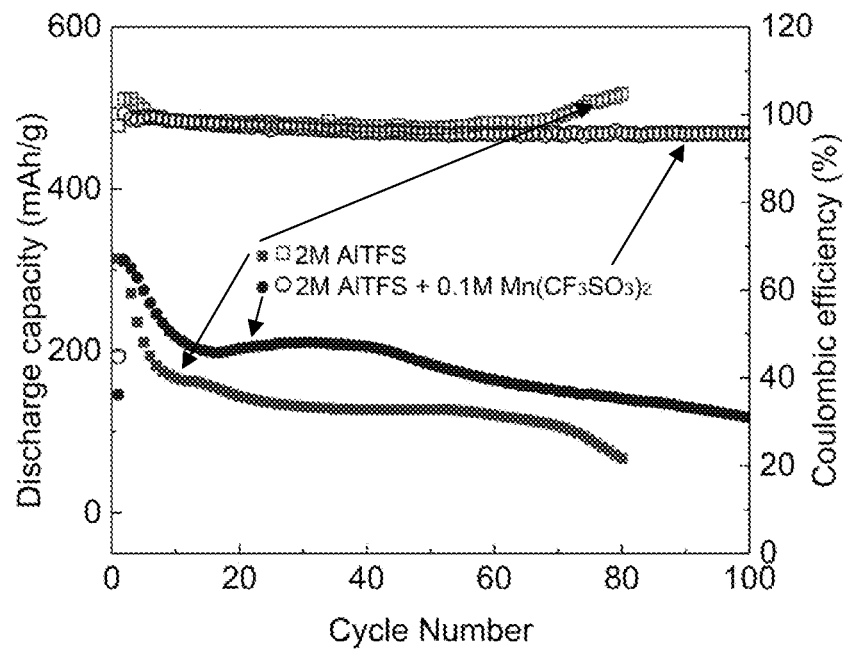
FIG. 15 shows cycling performance comparisons with or without $Mn(CF_3SO_3)_2$ addition at current density of 200 mA/g. One reason of the capacity fading of Al—$MnO_2$ batteries is due to the dissolution of low valence manganese oxide. The addition of $Mn^{2+}$ has been used to improve the performance of Zinc-$MnO_2$ batteries. The cycling performance is further improved by adding $Mn(CF_3SO_3)$, which can deliver a capacity over 100 mAh/g after 100 cycles.

To understand the electrochemical reactions and charge transport processes at the MnO$_2$ cathode, cyclic voltammetry (CV) measurements were performed at different scan rates (FIG. 3B). Of particular interest is how/why the bulky Al$^{3+}$ ions in an aqueous solution are able to reversibly access the α-MnO$_2$ electrode. One major reduction peak (located at about 1.2~1.4V) and one oxidation peak (located at about 1.5~1.9V) are observed at all of scan rates. The peak current for both the reduction and oxidation peaks follows an obvious linear relationship with the square root of the scan rate (see inset to FIG. 3B), indicating that the electrode reactions are Faradaic and that transport at the MnO$_2$ electrode is under diffusion control. The results further show that TAl—MnO$_2$ cells based on the 2M AlTFS electrolyte exhibit the highest levels of reversibility and stable capacity retention after 40 cycles of charge and discharge at a rate of 100 mA/g, achieving a discharge capacity of 168 mAh/g, (FIG. 7C). All TAl—MnO$_2$ cells show some level of capacity fading. A straightforward approach for improving the capacity retention is to lower the thermodynamic driving force for the dissolution process by introducing a finite concentration of low-valency Mn salt into the electrolyte. 0.1 M Mn(CF$_3$SO$_3$)$_2$ salt was introduced to the electrolyte and observed substantial improvements in both the discharge capacity and capacity retention, resulting in TAl—MnO$_2$ cells that can be reversibly cycled for over 100 cycles at a rate of 200 mA/g (FIG. 15). The cells also show promising high rate performance, achieving a capacity close to 100 mAh/g at a current density of 500 mA/g (FIG. 7D).

Figure 4:
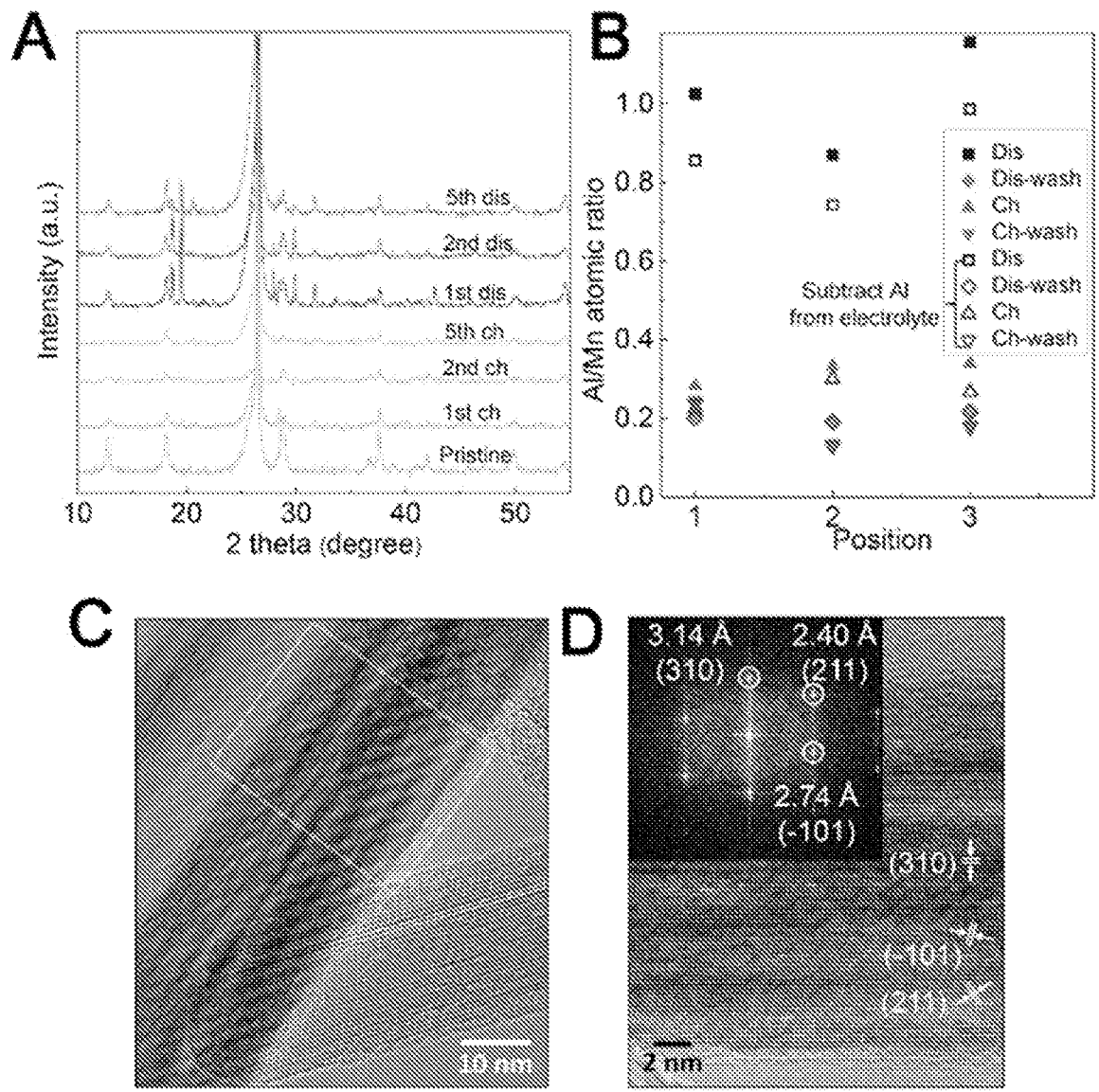
FIG. 4 shows reaction mechanism of Al with $\alpha$-$MnO_2$ in aqueous electrolyte. (A) XRD patterns of $MnO_2$ cathodes at fully discharged and charged states after different numbers of cycle. (B) Al/Mn ratio by SEM-EDX analysis of cathode after the 1st discharge and charge (washed or unwashed; include or subtract Al from electrolyte). (C) High-resolution TEM image and (D) corresponding enlarged view of pristine $MnO_2$ cathode. The inset in D is the fast Fourier transform (FFT) of the image. (E) High-resolution TEM image, (F) FFT pattern, and (G) corresponding enlarged part of discharged $MnO_2$ cathode. (H) Annular dark-field scanning transmission electron microscope (STEM) image and corresponding electron energy-loss spectroscopy (EELS) mapping of fully discharged $MnO_2$ cathode nanorod. (I) The two Mn valence states present were likely $MnO_2$ and $Mn_3O_4$, as determined by multivariate curve resolution analysis of the Mn $L_{2,3}$-edge.
Figure 4:
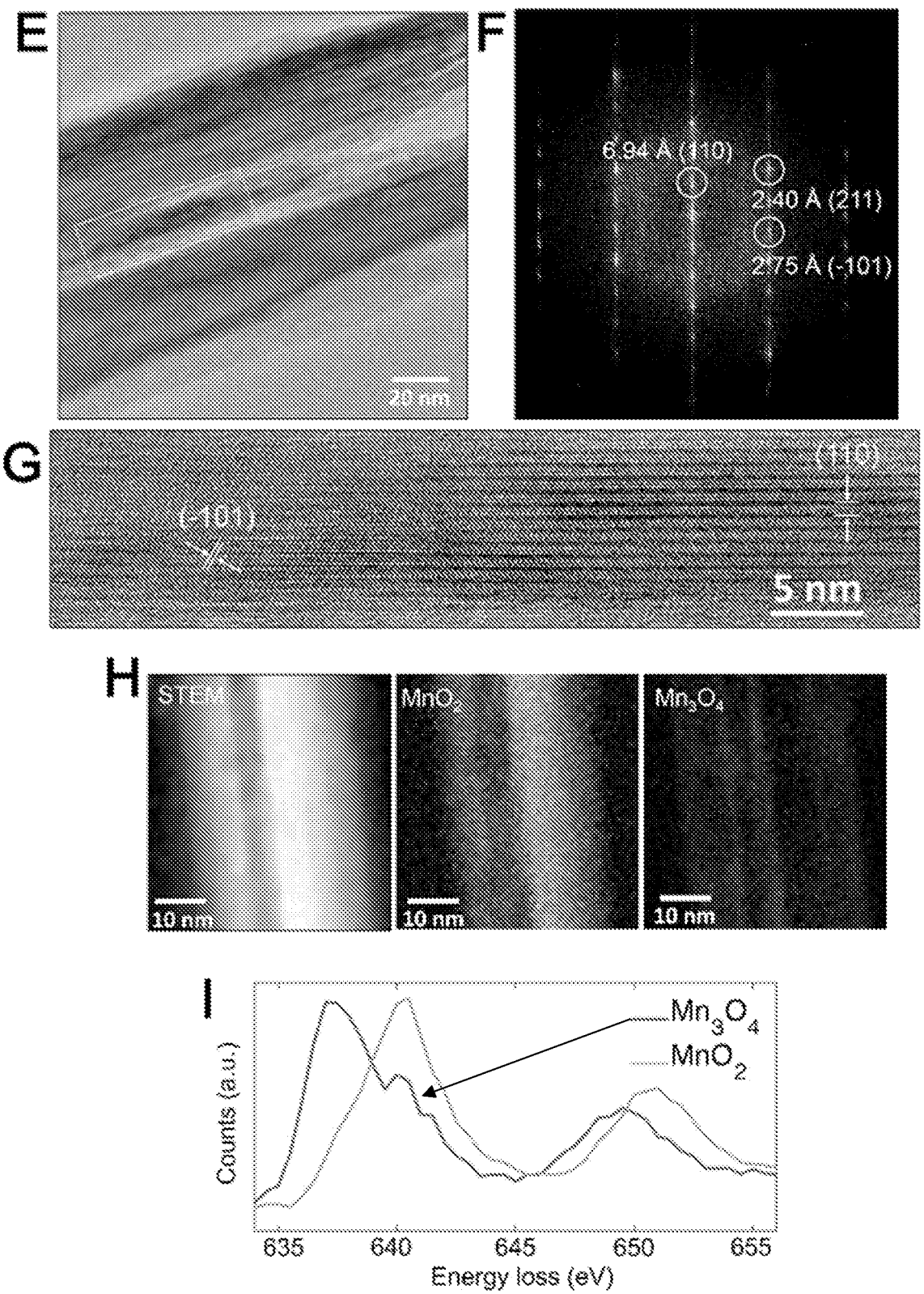
Figure 16:
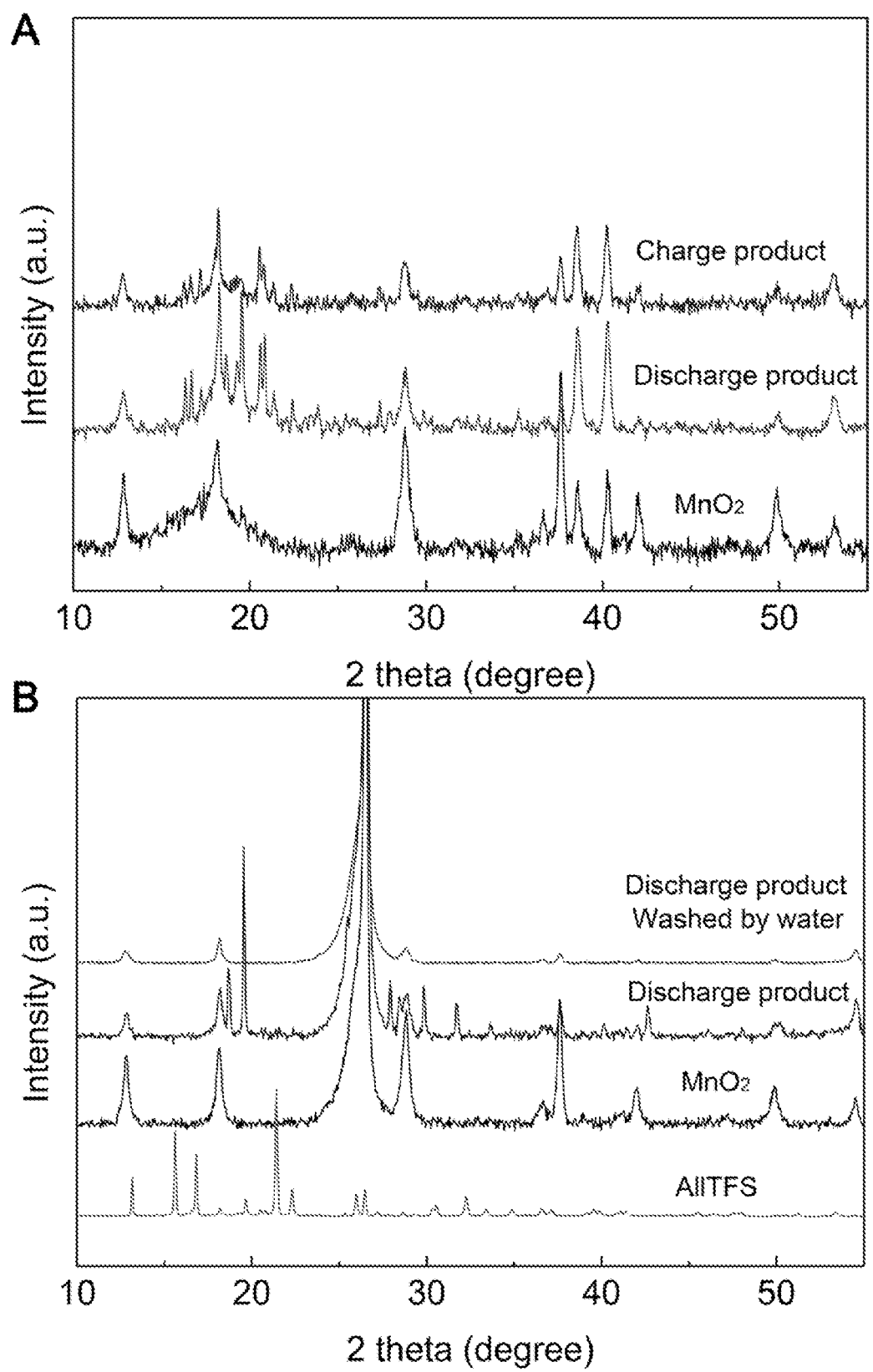
FIG. 16 shows XRD patterns of (A) discharge/charge products on Ti foil and (B) discharge product on carbon fiber paper with or without washing. In order to eliminate the effect of peaks existed in current collector, a Ti foil current collector was used to detect the product. The results are similar with FIG. 4A. The new discharge peaks is water and ethanol soluble, and not belong to any peaks of salt in electrolyte.
Figure 17:
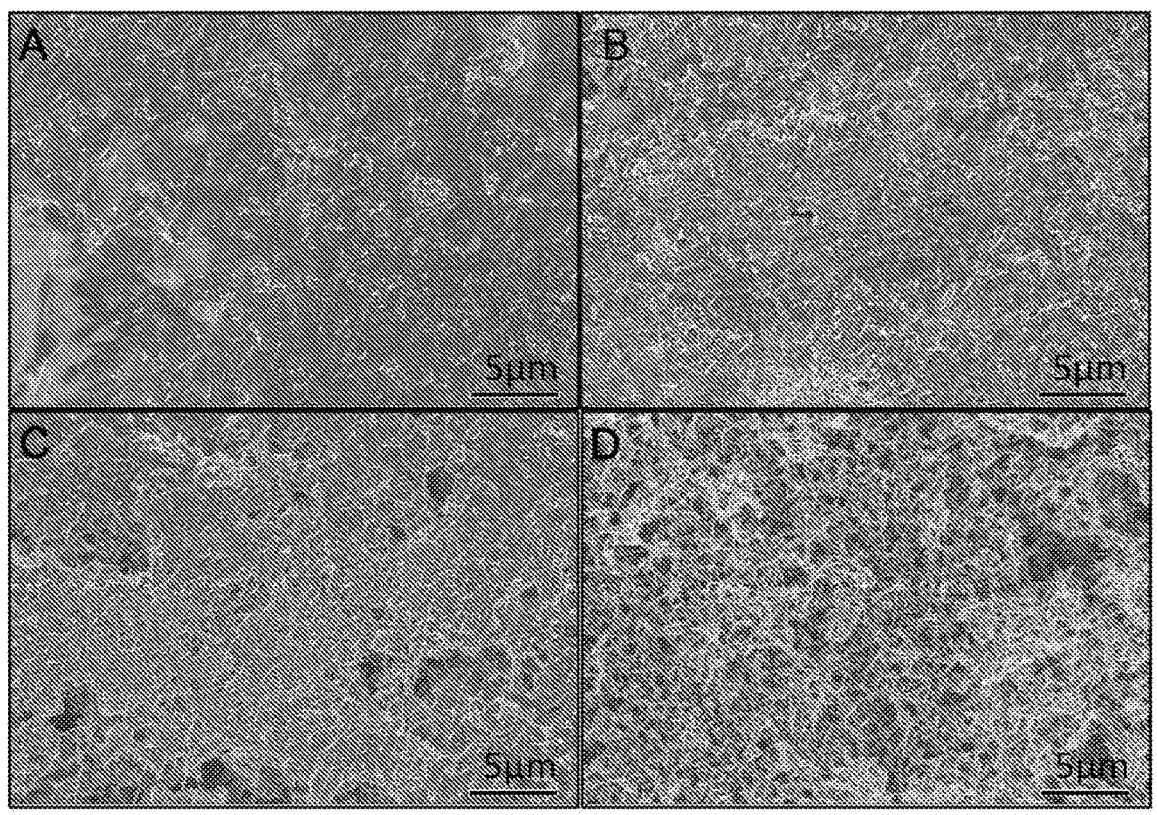
FIG. 17 shows SEM images of $MnO_2$ electrode. Discharged electrode (A) without washing, (B) after washing by water. Charged $MnO_2$ electrode (C) without washing, (D) after washing by water. After discharge, the morphologies of $MnO_2$ electrode is covered with soft product, which can be easily washed using water or ethanol. As comparisons, the charged product shows clear nanorod structures even without washing.
Figure 21:
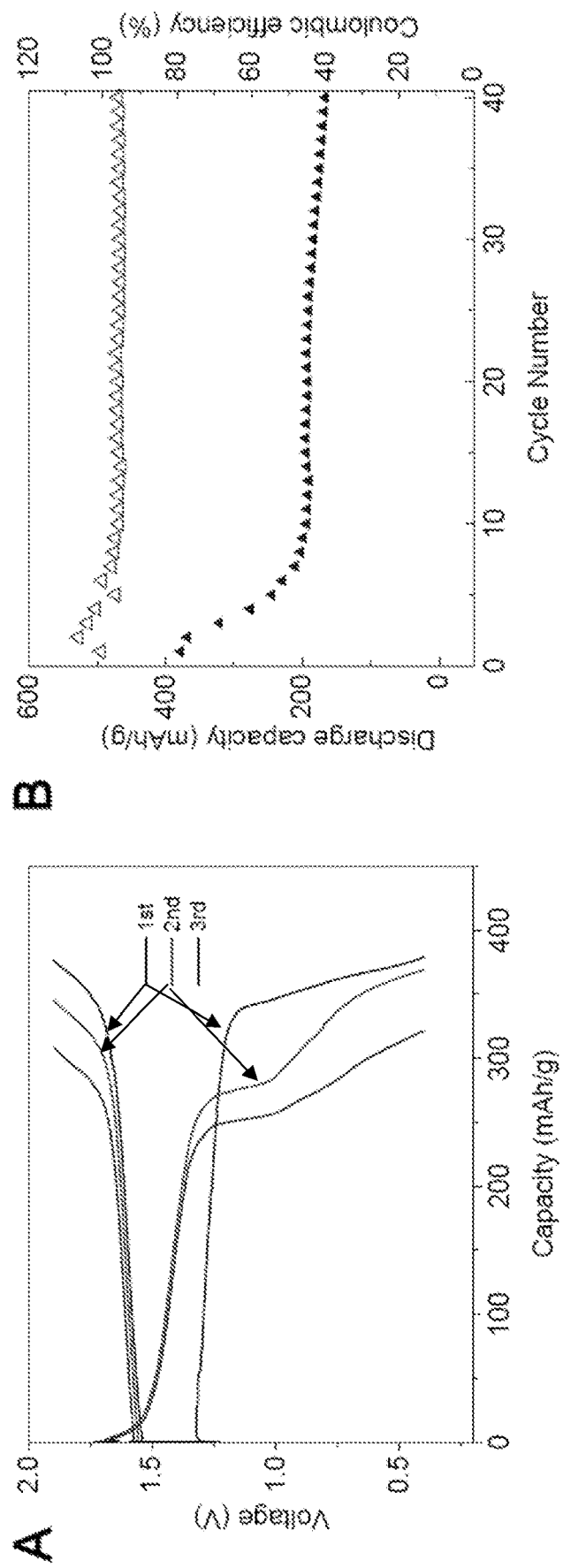
FIG. 21 shows (A) galvanostatic discharge/charge curves of aqueous Al batteries at a current density of 100 mA/g ($MnO_2$) using TAl and electrolyte of 2 M AlTFS [Al($CF_3SO_3$)$_3$] in $H_2O$. (B) Corresponding cycling performance.

The mechanism of aqueous Al batteries—Further insights into the electrochemical processes at the cathode can be obtained from a combination of X-ray diffraction (XRD), electron microscopy, and spectroscopic analysis. XRD patterns obtained for cells at different stages of cycling (FIG. 4A) show the electrode structure is highly stable after the recharge process. After full discharge, the peaks of MnO$_2$ remain and several new X-ray peaks are observed at the cathode (FIG. 16), which cannot be assigned to any known Mn-based product. These peaks can be eliminated by washing the cathode with water (FIG. 16), indicating that the compound(s) responsible are water soluble. Analysis of the cathode by SEM shows that the MnO$_2$ nanorods are well-covered with a compact, smooth coating after the discharge (FIG. 17A-B). Charging the cell results in the disappearance of the coating from the nanorod structure (FIG. 17C-D), indicating that the material is created by an electrochemical process at the MnO$_2$ cathode and that its formation/removal reactions are reversible. Further EDX spectroscopic analysis of the cathode (FIG. 18, Table 1) indicates that the discharge product displays a much higher Al/Mn atomic ratio than the charge product (FIG. 4B). This analysis also shows that the Al component is diminished after washing the electrode with water, indicating the Al rich discharge product is the soluble phase. Transmission electron microscopy (TEM) analysis of the pristine MnO$_2$ shows the nanorod structure has a high level of crystallinity and that α-MnO$_2$ is clearly present (FIG. 4C-D). The MnO$_2$ retains its nanorod structure after discharge (FIG. 19). By means of high-resolution TEM analysis, confirms the nanorod structure is crystalline MnO$_2$ (FIG. 4E-G). No obvious Al signal is detected in the discharged MnO$_2$ nanorod by electron energy-loss spectroscopy (EELS). However, EELS mapping reveals that a low valence Mn material (most likely Mn$_3$O$_4$) is present on the nanorod surface (29) (FIG. 4H-I). XPS results show that the proportion of reduced Mn valence states is largely increased in discharged product. (FIG. 21). These results indicate electrochemical transitions at α-MnO$_2$ in other metal batteries to propose the following reaction mechanism for our aqueous Al—MnO$_2$ electrochemical cells:

Anode: $Al - 3e^- \rightleftharpoons Al^{3+}$

Cathode: $3H_2O \rightleftharpoons 3H^+ + 3OH^-$ $$xMnO_2 + 3e^- + 3H^+ \rightleftharpoons yMnO_{\left(2-\frac{3}{2y}\right)}@(x, y)MnO_2 + \frac{3}{2}H_2O (1.5 < y < 3)$$

$$Al^{3+} + 3OH^- + [ele] + zH_2O \rightleftharpoons Al(OH)_3[ele]zH_2O$$

Overall: $Al + xMnO_2 + \left(\frac{3}{2} + z\right)H_2O + [ele] \rightleftharpoons MnO_{\left(2-\frac{3}{2y}\right)}@(x-y)MnO_2 + Al(OH)_3[ele]zH_2O$ The major reaction happening in the Al cells can therefore be thought to involve two major steps. The stripping of aluminum at the anode reduces MnO$_2$, which causes the appearance of the amorphous layer on MnO$_2$. The resultant discharge product of MnO$_2$ displays a core shell type morphology, in which the amorphous shell consist of low valence manganese oxide and the crystal core still retains the structure of the α-MnO$_2$ rods. In addition, the Al-ions stripped from the anode may react with electrolyte and form a complicated product rich in Al and electrolyte components.

Discussion—Our results demonstrate that a good SEI on Al provides a key step toward enabling high capacity aqueous aluminum batteries. In particular, we find that replacing the natural passivating oxide film on Al with an IL-rich artificial SEI facilitates reversible stripping and plating process at a metallic Al anode. By coupling such anodes with a simple manganese oxide cathode, the aqueous Al batteries we further find that the resultant Al cells deliver an energy density up to 500 Wh/kg. Our studies therefore open a new path towards achievement of high capacity, low cost, and safe aqueous batteries.

Materials and methods—Preparation of electrolyte. The AlCl$_3$-Ionic liquid (IL) electrolyte was synthesized in Ar filled glove box (Inert Inc.) through slowly adding aluminum chloride (AlCl$_3$) (99.99%; Sigma-Aldrich) into 1-ethyl-3-methylimidazolium chloride ([EMIm]Cl) (>95%; Sigma-Aldrich) (AlCl$_3$/[EMIm]Cl is 1.3:1). The aqueous electrolyte was prepared by dissolving corresponding mole salts into water. For example, 10 mM, 20 mM, 30 mM, 50 mM Aluminum trifluoromethanesulfonate [Al(CF$_3$SO$_3$)$_3$ or AlTFS](Alfa Aesar, 99%) was added to 10 ml water in order to prepare the AlTFS electrolyte with concentration of 1M, 2M, 3M and 5M, respectively. 1M Al$_2$(SO$_4$)$_3$ aqueous electrolyte is prepared by adding 10 mM $Al_2(SO_4)_3 \cdot 18H_2O$ (Aldon Corp, Lab grade) into 10 ml water.

Preparation of α-$MnO_2$ nanorod. α-$MnO_2$ was prepared by a traditional hydrothermal method (31). In a typical experiment, 5 mM $KMnO_4$ was firstly dissolved into the solution of 24 ml 1.0 M HCl. Then the volume was filled to 70 ml by adding distilled water. After stirring for half an hour, the solution was transferred to a 100 ml hydrothermal reactor. The reactor was placed at 140° C. and reacted for 18 hours. The solution was then filtered to obtain the solid product, which was washed by distilled water and ethanol for three times. After drying in a vacuum oven at 80° C., we finally got the $MnO_2$ nanorods.

Preparation of Al anode. Al foil (0.25 mm thick, annealed, 99.99%, Alfa Aesar) is used as the source of anode. Before using, the Al foil was polished with sand paper until the surface shined with metallic luster, which was used as common Al anode. For IL treated Al anode (T-Al), the common Al was impregnated in the ionic liquid electrolyte or over one day. Then the wet surface was cleaned before using for characterization and assembling any types of batteries.

Preparation of Al batteries. All metal Al based aqueous batteries (Symmetric Al batteries, Al-carbon fiber paper batteries, Al—$MnO_2$ batteries) were assembled in atmospheric environment using coin 2032 type battery model. Glass fiber or Celgard 3501 was used as separator. For preparing $MnO_2$ cathodes, $MnO_2$, super P and Polyvinylidene fluoride (PVDF) with weight ratio of 70:20:10 were mixed with N-methyl-2-pyrrolidinone (NMP) and painted on carbon fiber paper or Ti foil. The cathode was obtained after removing NMP at 80° C. overnight. The areal loading of $MnO_2$ is about 2 $mg/cm^2$.

Characterizations of materials and batteries. D.C. ionic conductivity and electrochemical impedance spectroscopy (EIS) were measured using a Novocontrol Broad band dielectric/impedance spectrometer. FESEM images of $MnO_2$ cathode and Al anode were obtained on the instrument of Leo 1550 Keck Field Emission Scanning Electron Microscopy, in which EDX analysis were also carried with Bruker EDX detector. The XRD pattern of α-$MnO_2$ cathodes during electrochemical reaction were taken with the instrument of Rigaku X-Ray diffractometer. ATR-FTIR spectra of different electrolyte were obtained using a Bruker Hyperion FT-IR Spectrometer. X-ray photoelectron spectroscopy (XPS) SSX-100 was applied to study the chemistry information of SEI on Al surface and $MnO_2$ cathodes. Galvanostatic measurements of Al batteries were performed using Neware battery testers at room temperature. Cyclic voltammetry (CV) diagram was performed on an electrochemical workstation of CH 600E. TEM images were obtained from the FEI Titan Themis CryoS/TEM, in which EELS spectra was obtained from a Gatan GIF Tridiem energy filter.

TABLE 1

Figure 18:
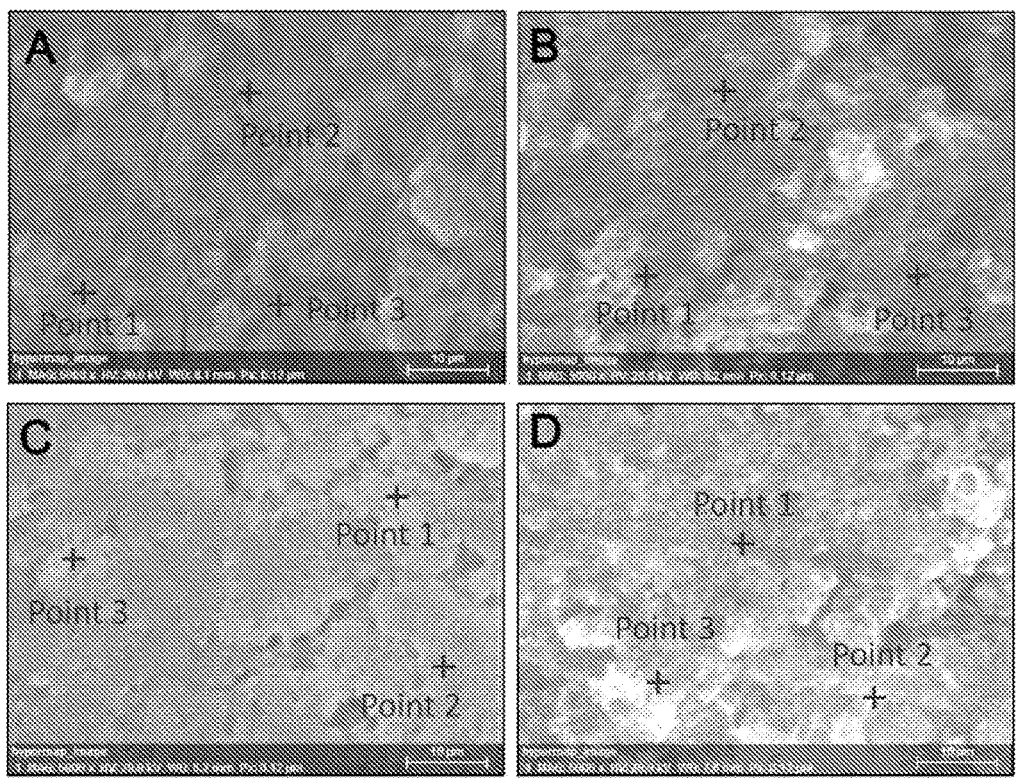
FIG. 18 shows SEM images and selected positions of EDX studies. The figures A, B, C, D corresponds to the discharged $MnO_2$ electrode without washing, discharged $MnO_2$ electrode after washing, charged $MnO_2$ electrode without washing, charged $MnO_2$ electrode after washing. The atomic ratio of Al and Mn is calculated as displayed in FIG. 4B and Table 1. The ratio of Al and Mn subtracting Al in electrolyte is calculated through the relationship of Al:S=1:3 in $Al(CF_3SO_3)_3$. The voltage used for EDX analysis is 20 kV.
Figure 19:
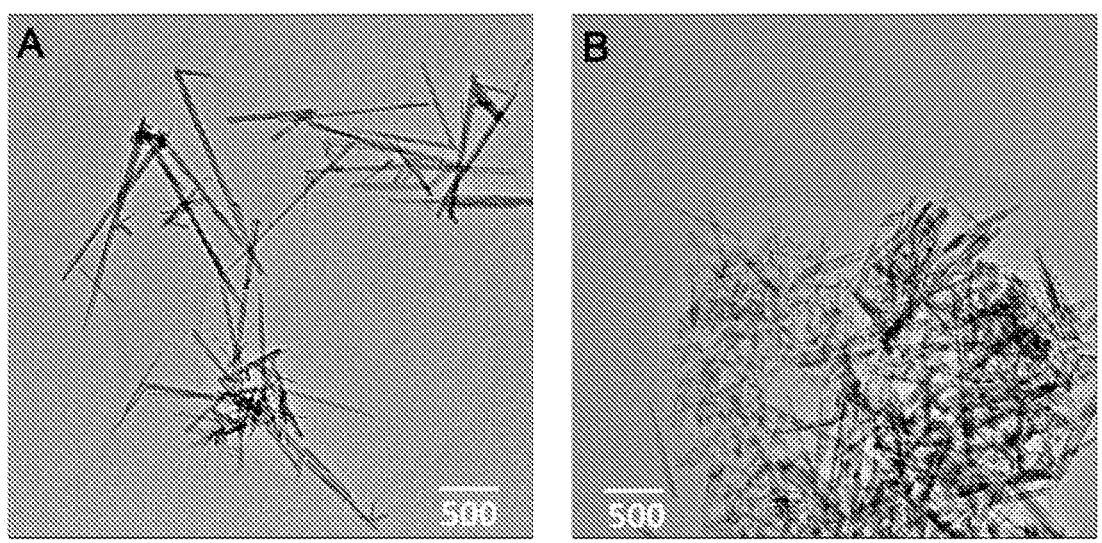
FIG. 19 shows TEM images of (A) pristine $MnO_2$ nanorod and (B) discharged $MnO_2$ nanorod.
Figure 20:
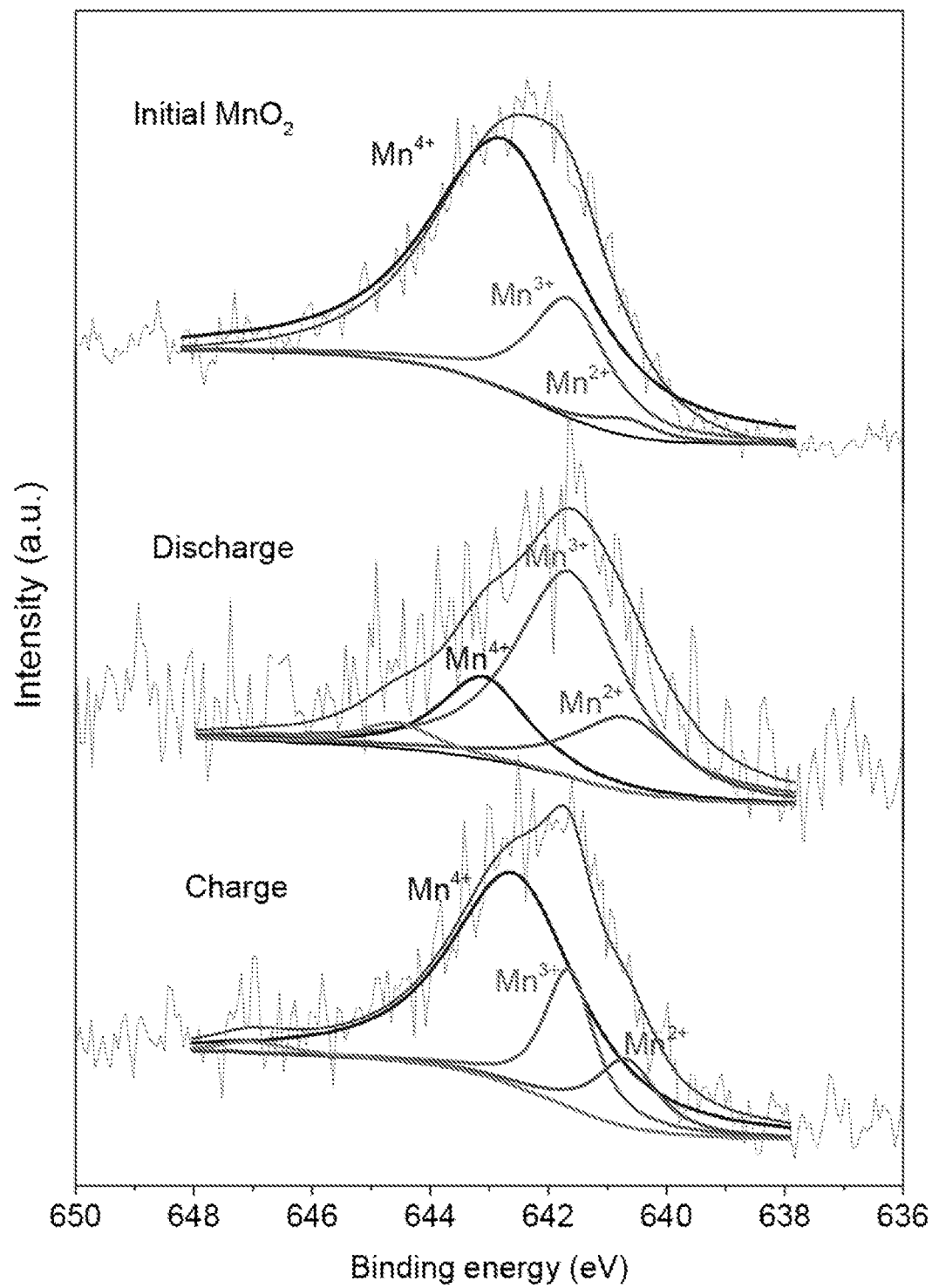
FIG. 20 shows XPS $Mn_{2p3/2}$ spectra of pristine $MnO_2$, fully discharged $MnO_2$ cathode and fully charged $MnO_2$ cathode. The fitting of $Mn_{2p3/2}$ has been widely used to analyze the oxidation of Mn. According to fitting curves the XPS spectra, for pristine $MnO_2$, most of oxidation state of Mn is $Mn^{4+}$, with small a bit of $Mn^{2+}$, $Mn^{3+}$. For fully discharge cathode, most of oxidation state of Mn is $Mn^{3+}$, indicating the reduction of $MnO_2$. This process is reversible in charged cathode.

EDX analysis of points tested in FIG. 18

| Element (atom %) | C | O | F | K | Al | S | Mn | Al/Mn | Al/Mn (subtract Al from electrolyte) |
|---|---|---|---|---|---|---|---|---|---|
| A1 | 39.11 | 24.33 | 19.24 | 0.88 | 6.65 | 3.31 | 6.48 | 1.03 | 0.86 |
| A2 | 36.74 | 26.08 | 19.93 | 0.99 | 6.30 | 2.72 | 7.25 | 0.87 | 0.74 |
| A3 | 35.77 | 22.28 | 20.99 | 1.00 | 8.64 | 3.85 | 7.46 | 1.16 | 0.99 |
| B1 | 53.68 | 23.51 | 4.66 | 1.67 | 2.79 | 0.26 | 13.44 | 0.21 | 0.20 |
| B2 | 62.82 | 16.42 | 7.70 | 1.27 | 1.89 | 0.14 | 9.75 | 0.19 | 0.19 |
| B3 | 68.03 | 14.53 | 5.21 | 1.10 | 1.99 | 0.14 | 9.00 | 0.22 | 0.22 |
| C1 | 9.95 | 48.01 | 15.82 | 1.97 | 4.70 | 2.96 | 16.59 | 0.28 | 0.22 |
| C2 | 10.03 | 46.69 | 13.83 | 1.85 | 6.50 | 4.15 | 16.95 | 0.33 | 0.30 |
| C3 | 13.09 | 44.34 | 15.67 | 1.89 | 5.45 | 3.53 | 16.03 | 0.34 | 0.27 |
| D1 | 61.67 | 15.18 | 7.56 | 0.66 | 2.90 | 0.28 | 11.75 | 0.25 | 0.24 |
| D2 | 42.05 | 30.81 | 8.72 | 1.34 | 1.98 | 0.20 | 14.60 | 0.14 | 0.13 |
| D3 | 56.19 | 23.32 | 7.87 | 0.81 | 1.82 | 0.17 | 9.81 | 0.19 | 0.18 |

A1-D3 stands for the points in FIG. 18. There are many sources of C and O element (such as $MnO_2$, super P, binder, substrate of SEM stage), which are always taking up the most part of composition. The F exists both in $Al(CF_3SO_3)_3$ and PVdF binder. K is introduced from the preparation process. The S is originally exists in electrolyte, which share the atomic ratio with Al at 3:1. After discharge, the ratio is much lower than 3:1, indicating Al also exist in product, which is also proved by the high Al/Mn ratio. After washing by water, most of S and Al are disappeared, indication the Al-based discharge product are water soluble. For charging process, the ratio of Al/Mn is much smaller, indicating the Al striping from the discharge product. Although the EDX spectra are semi-quantitative analysis methods, it can clearly illustrate the trends of element changed of $MnO_2$ cathodes.

EXAMPLE 2

This example provides an example of a passivation layer of the present disclosure and a method of making same.

Preparation of an ASEI on Al surface. Before using, the Al or Al alloy foil was polished with sand paper until the surface shined with metallic luster. Then the Al or Al alloy foil was treated by the ionic liquid electrolyte liquid (IL) melt $AlCl_3$-1-ethyl-3-methylimidazolium chloride ([EMIm]Cl). FIG. 21 shows (A) galvanostatic discharge/charge curves of aqueous Al batteries at a current density of 100 mA/g ($MnO_2$) using TAl and electrolyte of 2 M AlTFS [$Al(CF_3SO_3)_3$] in $H_2O$. (B) Corresponding cycling performance.

Although the present disclosure has been described using specific examples, routine modifications will be apparent to those skilled in the art and such modifications are intended to be within the scope of the disclosure and the claims.

The invention claimed is:
1. A method for making an aluminum anode having a passivation layer comprising:
    contacting an aluminum anode or an aluminum alloy anode with a composition comprising:

one or more ionic liquid(s); and
aluminum trichloride ($AlCl_3$), aluminum fluoride ($AlF_3$), aluminum bromide ($AlBr_3$), aluminum iodine ($AlI_3$), or a combination thereof,
wherein the aluminum anode or aluminum alloy having a passivation layer is formed;
wherein the contacting comprises coating the composition on the aluminum anode or the aluminum alloy anode, and wherein the coating is dip coating, spin coating, magnetron sputtering, atomic layer deposition, or a combination thereof.

2. The method of claim 1, wherein the ionic liquid is a halogen-containing ionic liquid.

3. The method of claim 2, wherein the halogen-containing ionic liquid is an imidazolium chloride.

4. The method of claim 3, wherein the imidazolium chloride is chosen from 1-ethyl-3-methylimidazolium chloride ([EMIm]Cl), 1-butyl-3-methylimidazolium trifluoromethanesulfonate ([BMIm]OTF), 1-ethyl-3-methylimidazolium tetrafluoroborate, ([EMIm]$BF_4$), 1-ethyl-3-methylimidazolium bis(trifluoromethylsulfonyl)imide ([EMIm]TFSI), 1-ethyl-3-methylimidazolium bromide ([EMIm]Br), 1-Ethyl-3-methylimidazolium hexafluorophosphate ([EMIm]$PF_6$), and combinations thereof.

5. The method of claim 1, wherein the ratio of the aluminum trichloride ($AlCl_3$), aluminum fluoride ($AlF_3$), aluminum bromide ($AlBr_3$), aluminum iodine ($AlI_3$), or a combination thereof to ionic liquid(s) is 0.5:1 to 2:1.

6. The method of claim 5, wherein the ratio of the aluminum trichloride ($AlCl_3$), aluminum fluoride ($AlF_3$), aluminum bromide ($AlBr_3$), aluminum iodine ($AlI_3$), or a combination thereof to ionic liquid(s) is 1.5:1.

7. The method claim 1, wherein the method further comprises removal of substantially all or all of an unreacted portion of the composition.

8. The method of claim 1, wherein the passivation layer is not formed in situ in a battery.

9. The method of claim 1, wherein the passivation layer is formed independently from a complete battery.

10. An aqueous aluminum battery comprising:
an aluminum anode or an aluminum alloy anode having a passivation layer disposed on at least a portion of the surfaces of the aluminum anode or the aluminum alloy anode;
a cathode; and
an aqueous electrolyte;
wherein the passivation layer is formed independently from a complete battery.

11. The aqueous aluminum battery of claim 10, wherein the passivation layer is bonded to the surface of the aluminum anode or the aluminum alloy anode.

12. The aqueous aluminum battery of claim 10, wherein the passivation layer comprises an organic, nitrogen-rich material and inorganic, Al-halide rich or Al-nitrate rich material.

13. The aqueous aluminum battery of claim 12, wherein the passivation layer further comprises an C=N containing organic material.

14. The aqueous aluminum battery of claim 10, wherein the passivation layer is hydrophobic or at least amphiphilic.

15. The aqueous aluminum battery of claim 10, wherein the aqueous electrolyte does not comprise an ionic liquid.

16. The aqueous aluminum battery of claim 10, wherein the aqueous aluminum battery further comprises a polymer layer and/or a metal layer, wherein the polymer layer and/or the metal layer are disposed between the aluminum anode or the aluminum alloy anode and the aqueous electrolyte.

17. The aqueous aluminum battery of claim 10, wherein the passivation layer further comprises a polymer layer and/or a metal layer, the polymer layer and/or metal layer are disposed between the aluminum anode or the aluminum alloy anode and the aqueous electrolyte.

18. The aqueous aluminum battery of claim 10, wherein the aluminum alloy comprises a non-aluminum metal chosen from silicon, iron, copper, manganese, magnesium, chromium, zinc, vanadium, titanium, barium, gallium, lead, zirconium, and combinations thereof.

19. The aqueous aluminum battery of claim 10, wherein the passivation layer has a thickness of 2 nm to 500 microns.

20. The aqueous aluminum battery of claim 10, wherein the cathode comprises a material chosen from
transition metal oxides,
transition metal sulfides,
doped transition metal oxides or complex metal oxides,
doped transition metal sulfides,
complex metal sulfides,
aluminum-containing materials, and
combinations thereof.

21. The aqueous aluminum battery of claim 20, wherein the transition metal oxides are chosen from manganese oxides, vanadium oxides, cobalt oxides, titanium oxides, iron oxides, tungsten oxides, and combinations thereof.

22. The aqueous aluminum battery of claim 21, wherein the manganese oxides are chosen from $\alpha$-$MnO_2$, $\beta$-$MnO_2$, $\gamma$-$MnO_2$, $\epsilon$-$MnO_2$, $\lambda$-$MnO_2$, and combinations thereof, or the transition metal sulfides are chosen from $FeS_2$, $MoS_2$, $TiS_2$, $WS_2$, and combinations thereof, or the doped transition metal oxides are doped manganese oxides chosen from $Mg_xMnO_2 \cdot yH_2O$, $CoMn_2O_4$, and combinations thereof.

23. The aqueous aluminum battery of claim 10, wherein the aqueous electrolyte is 10 to 100% by weight water.

24. The aqueous aluminum battery of claim 10, wherein the aqueous electrolyte is chosen from aqueous aluminum salt compositions and combinations thereof.

25. The aqueous aluminum battery of claim 24, wherein the aqueous aluminum salt is chosen from $Al(CF_3SO_3)_3$, $Al_2(SO_4)_3$, $Al(NO_3)_3$, $AlCl_3$, $Al(CH_3COO)_3$, $AlBr_3$, $AlPO_4$, $Al(PO_3)_3$, $AlF_3$, $AlI_3$, $Al(ClO_4)_3$, and combinations thereof.

26. The aqueous aluminum battery of claim 10, further comprising an electrochemically active ion, wherein the electrochemically active ion comprises $Al^{3+}$, Al complex cations, or a combination thereof.

27. The aqueous aluminum battery of claim 10, wherein the aqueous aluminum battery is rechargeable.

28. The aqueous aluminum battery of claim 10, wherein the aqueous aluminum battery further comprises a separator.

29. The aqueous aluminum battery of claim 28, where the separator is a porous inorganic or polymer material or cation selective separator.

30. The aqueous aluminum battery of claim 29, wherein the porous inorganic or polymer material is chosen from polypropylene (PP) separators, polyethylene (PE) separators, and glass fiber separators.

31. The aqueous aluminum battery of claim 10, wherein the passivation layer is not formed in situ in the aqueous aluminum battery.

32. A device comprising one or more aqueous aluminum battery of claim 10.

33. The device of claim 32, wherein the device is an electronic device.

34. The device of claim 33, wherein the electronic device is a portable electronic device or a storage device.

35. A method for making an aluminum anode having a passivation layer comprising:

contacting an aluminum anode or an aluminum alloy anode with a composition comprising:
one or more ionic liquid(s); and
aluminum trichloride (AlCl$_3$), aluminum fluoride (AlF$_3$), aluminum bromide (AlBr$_3$), aluminum iodine (AlI$_3$), or a combination thereof,
wherein the aluminum anode or aluminum alloy having a passivation layer is formed; and,
removing substantially all or all of an unreacted portion of the composition.

36. A method for making an aluminum anode having a passivation layer comprising:
contacting an aluminum anode or an aluminum alloy anode with a composition comprising:
one or more ionic liquid(s); and
aluminum trichloride (AlCl$_3$), aluminum fluoride (AlF$_3$), aluminum bromide (AlBr$_3$), aluminum iodine (AlI$_3$), or a combination thereof,
wherein the aluminum anode or aluminum alloy having a passivation layer is formed; and
wherein the passivation layer is not formed in situ in a battery.

37. A method for making an aluminum anode having a passivation layer comprising:
contacting an aluminum anode or an aluminum alloy anode with a composition comprising:
one or more ionic liquid(s); and
aluminum trichloride (AlCl$_3$), aluminum fluoride (AlF$_3$), aluminum bromide (AlBr$_3$), aluminum iodine (AlI$_3$), or a combination thereof,
wherein the aluminum anode or aluminum alloy having a passivation layer is formed; and
wherein the passivation layer is formed independently from a complete battery.

38. An aqueous aluminum battery comprising:
an aluminum anode or an aluminum alloy anode having a passivation layer disposed on at least a portion of the surfaces of the aluminum anode or the aluminum alloy anode, wherein the passivation layer comprises an organic, nitrogen-rich material and inorganic, Al-halide rich or Al-nitrate rich material;
a cathode; and
an aqueous electrolyte.

39. The aqueous aluminum battery of claim 38, wherein the passivation layer further comprises an C=N containing organic material.

40. An aqueous aluminum battery comprising:
an aluminum anode or an aluminum alloy anode having a passivation layer disposed on at least a portion of the surfaces of the aluminum anode or the aluminum alloy anode;
a cathode; and
an aqueous electrolyte;
wherein the passivation layer is hydrophobic or at least amphiphilic.

41. An aqueous aluminum battery comprising:
an aluminum anode or an aluminum alloy anode having a passivation layer disposed on at least a portion of the surfaces of the aluminum anode or the aluminum alloy anode;
a cathode; and
an aqueous electrolyte;
wherein the passivation layer has a thickness of 2 nm to 500 microns.

42. An aqueous aluminum battery comprising:
an aluminum anode or an aluminum alloy anode having a passivation layer disposed on at least a portion of the surfaces of the aluminum anode or the aluminum alloy anode;
a cathode; and
an aqueous electrolyte;
wherein the passivation layer is not formed in situ in the aqueous aluminum battery.

* * * * *